(12) United States Patent  (10) Patent No.:  US 8,521,582 B2
Lertzman et al.  (45) Date of Patent:  Aug. 27, 2013

(54) SYSTEM AND METHOD FOR COLLABORATIVE AFFINITY MARKETING

(75) Inventors: John E. Lertzman, Agoura Hills, CA (US); John W. Hawekotte, Jr., Fullerton, CA (US)

(73) Assignee: Community Force, LLC, Fullerton, CA (US)

( * ) Notice: Subject to any disclaimer, the term of this patent is extended or adjusted under 35 U.S.C. 154(b) by 3530 days.

(21) Appl. No.: 10/612,518

(22) Filed: Jul. 2, 2003

(65) Prior Publication Data

US 2004/0006510 A1  Jan. 8, 2004

Related U.S. Application Data

(60) Provisional application No. 60/393,157, filed on Jul. 2, 2002.

(51) Int. Cl.
*G06Q 30/00* (2012.01)

(52) U.S. Cl.
USPC ... 705/14.1; 705/14.3; 705/14.16; 705/14.24; 705/14.36

(58) Field of Classification Search
USPC .............................. 705/14, 14.3, 14.24, 14.36
See application file for complete search history.

(56) References Cited

U.S. PATENT DOCUMENTS

| | | | | |
|---|---|---|---|---|
| 555,497 | A | * | 3/1896 | Chevrier ................. 144/28.11 |
| 5,466,919 | A | * | 11/1995 | Hovakimian ............... 705/17 |
| 5,546,303 | A | * | 8/1996 | Helbling .................... 705/30 |
| 5,555,497 | A | | 9/1996 | Helbling |
| 5,621,640 | A | * | 4/1997 | Burke ......................... 705/14 |
| 5,696,366 | A | | 12/1997 | Ziarno |
| 5,724,518 | A | | 3/1998 | Helbling |
| 5,909,794 | A | * | 6/1999 | Molbak et al. ............. 194/216 |
| 5,937,391 | A | | 8/1999 | Ikeda et al. |
| 6,052,674 | A | | 4/2000 | Zervides et al. |
| 6,088,682 | A | | 7/2000 | Burke |
| 6,112,191 | A | * | 8/2000 | Burke ......................... 705/41 |
| 6,164,533 | A | * | 12/2000 | Barton ..................... 235/380 |
| 6,253,998 | B1 | | 7/2001 | Ziarno |
| 6,345,261 | B1 | * | 2/2002 | Feidelson et al. ........ 705/14.18 |
| 6,405,174 | B1 | * | 6/2002 | Walker et al. ............... 705/14 |
| 6,415,262 | B1 | * | 7/2002 | Walker et al. ............... 705/14 |
| 6,415,264 | B1 | | 7/2002 | Walker et al. |
| 6,945,453 | B1 | * | 9/2005 | Schwarz Jr. .............. 235/375 |

(Continued)

OTHER PUBLICATIONS

CharityWeb; http://www.charityweb.com; six sheets; Aug. 6, 2003.

(Continued)

*Primary Examiner* — James W Myhre
*Assistant Examiner* — Michael Goldman
(74) *Attorney, Agent, or Firm* — Christie, Parker & Hale, LLP

(57) ABSTRACT

In one embodiment, the present invention is a method and system for collaborative affinity marketing including a processor, an aggregator, a participant, and a merchant. The method and system include enrolling with the collaborative affinity marketing by the aggregator, participant, and merchant; assigning a participant identification code to the participant; storing enrollment information of the aggregator, participant, and merchant; providing the participant identification code to the merchant, when the participant initiates a purchase transaction with the merchant; storing the participant identification code and amount of purchase transaction by the merchant; sending the stored participant identification code, the amount of purchase transaction, and funds corresponding to a portion of the amount of purchase transaction to the processor; and sending a portion of the funds received by the processor from the merchant to the aggregator.

48 Claims, 23 Drawing Sheets

(56) References Cited

U.S. PATENT DOCUMENTS

| | | | |
|---|---|---|---|
| 6,985,879 B2* | 1/2006 | Walker et al. | 705/35 |
| 7,054,830 B1* | 5/2006 | Eggleston et al. | 705/14 |
| 7,251,617 B1* | 7/2007 | Walker et al. | 705/16 |
| 7,398,248 B2* | 7/2008 | Phillips et al. | 705/39 |
| 2002/0008146 A1 | 1/2002 | Singhal | |
| 2002/0046110 A1 | 4/2002 | Gallagher | |
| 2002/0087344 A1 | 7/2002 | Billings et al. | |
| 2002/0099654 A1 | 7/2002 | Nair | |
| 2002/0156676 A1* | 10/2002 | Ahrens et al. | 705/14 |
| 2002/0174011 A1* | 11/2002 | Sanchez et al. | 705/14 |
| 2003/0083930 A1* | 5/2003 | Burke | 705/14 |

OTHER PUBLICATIONS

Charity One; http://www.chairtyoneclub.com/memberinfo.htm; 3 sheets; Aug. 6, 2003.

Charity@Checkout; http://www.specialkidsfund.org/charity@checkout.htm; 2 sheets; Aug. 6, 2003.

Mu, et al; "A New Scheme of Credit Based Payment for Electronic Commerce"; 23rd Annual Conference on Local Computer Networks, LCN '98; Oct. 11-14, 1998; pp. 278-284; IEEE Computer Society, Los Alamitos, California.

Wang, et al., "Building a Consumer Scalable Anonymity Payment Protocol for Internet Purchases"; Proceedings of the 12th Int'l Wrkshps on Research Issues in Data Engineering: Engineering e-Commerce/e-Business Systems (RIDE '02); pp. 1-10; IEEE Computer Society.

ShopForChange; http://www.workingforchange.com/shop/index.cfm?CFID=2324062&CFTOKEN=49361123; 3 sheets; Aug. 6, 2003.

GreaterGood.com; http://www.greatergood.com/cgi-bin/WebObjects/GreaterGood.woa/161 . . . ; Shopping Directory; 2 sheets; Aug. 6, 2003.

WebCharity.com; http://www.wbecharity.com; 2 sheets; Aug. 6, 2003.

UK Fundraising; Free2give Launch Their UK Shopping Mall, http://www.fundraising.co.uk/news/2000/07/free2give.html; 3 sheets; Jul. 28, 2000.

iGive.com—Press Release; "At iGive.com, Spending for Causes Goes Up During Economic Downturn"; http://www.igive.com/html/body_pressrelease7.cfm; 2 sheets; Oct. 1, 2001; Evanston, IL.

Charity Mall; http://www.chairtymall.com/dynahtml/cmall/0/wdjGRgT7n0505UyM6sbWYw/faq.html; 3 sheets; Ann Arbor, MI; Aug. 6, 2003.

Moneytin.com; http://www.moneytin.com/mt-body.php3?howto; 4 sheets; Aug. 6, 2003.

MyCause.com; http://w.ww.mycause.com/fineprint.html; 5 sheets; Aug. 6, 2003.

Buy for Charity; http://www.buyforchairty.com; 1 sheet; Aug. 6, 2003.

Goodpurchase.com; http://www.goodpurchase.com/main.cfm; Aug. 6, 2003.

* cited by examiner

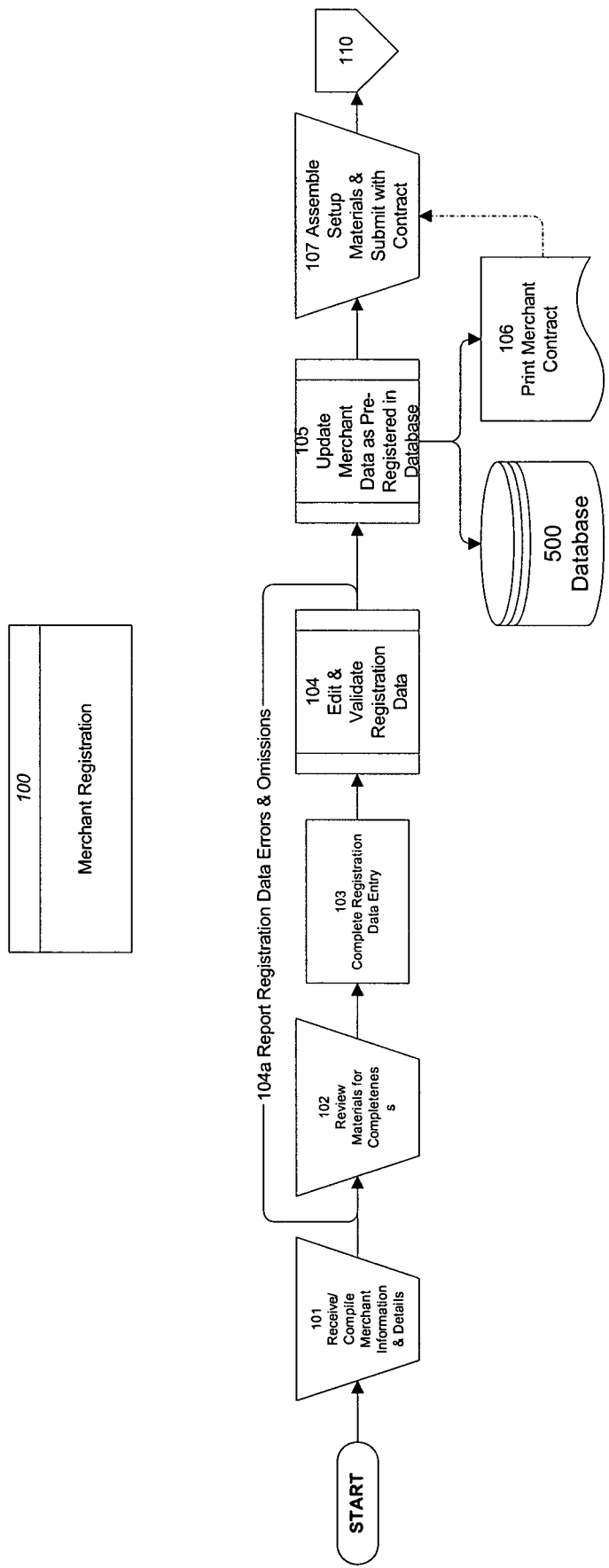

SYSTEM AND METHOD FOR COLLABORATIVE AFFINITY MARKETING

CROSS-REFERENCE TO RELATED APPLICATION

This patent application claims the benefit of the filing date of U.S. Provisional Patent Application Ser. No. 60/393,157, filed Jul. 2, 2002 and entitled "SYSTEM AND METHOD FOR COMMON AFFINITY MARKETING," the entire content of which is hereby expressly incorporated by reference.

FIELD OF THE INVENTION

The present invention relates to a method and system for collaborative affinity marketing. More specifically, the present invention is directed to a method and system for collaborative affinity marketing including one or more processor(s), aggregator(s), participant(s), and merchant(s).

BACKGROUND OF THE INVENTION

Merchants of all types depend on attracting new customers and securing the repeat business of existing customers. They have devised a variety of ways to provide incentives for their customers to return repeatedly, ultimately becoming loyal customers.

For example, many retail stores (such as grocery stores) issue prepaid vouchers, either paper or a plastic debit card, referred to as "scrip", which is used by consumers as a cash equivalent to purchase products at the respective stores. Not-for-profit entities, such as schools, can purchase scrip in bulk at a discounted price and sell it to affiliated supporters (such as parents of the students at the school) at the full price, making a profit for the school.

Alternatively, some merchants contribute a percentage of the purchase price (possibly, for just certain items) to a not-for-profit (aggregator) of the merchant's choice, to one that a purchaser (participant) can choose from a list provided by the merchant or processor, or one that is separately identified by the participants. The term "aggregator" has been used to describe the entity or organization that aggregates some number of participants in the program, among other functions. The term "processor" is used to describe the central entity or organization that processes participant transactions from the merchant and passes the benefits through to the aggregator, among other functions.

Electronic scrip, developed by eScrip, Inc. of San Mateo, Calif., is a system in which a supporter registers some or all of his debit and credit, ATM cards and grocery loyalty cards with eScrip and designates the not-for-profit entity that will receive the rebate. Monthly payments to the not-for-profit entities are made through the EFT system. Monthly reports are also provided that allow the not-for-profit entities to track funds raised by individual families on a monthly and year-to-date basis. Purchases can be made both on the Internet and at bricks-and-mortar vendor locations. There are several drawbacks to the electronic scrip system. First, there is no privacy or security of information for the participant: the merchant, aggregator, and credit card company all possess key personal and financial information about the participant. Secondly, the method is almost entirely dependent on credit or debit transactions in order to track applicable purchases and does not apply to payment by any other means (with the exception of cash purchases consumers make from grocery stores using their loyalty card). Third, the method is dependent on the credit or debit card processor to provide all information on participant purchases.

The CardScrip program, introduced by the National Scrip Center also supports both Internet and "bricks-and-mortar" purchases, employs EFT deposits to entity accounts and provides a reporting function that allows entity tracking of individual families' activities. CardScrip suffers from all of the drawbacks of electronic scrip in addition to the prerequisite that the participant must apply for, and be accepted for, the National Scrip Center Mastercard and use it in all transactions with merchant vendors. This is likely to discourage potential users who do not want, cannot use, or cannot qualify for, another credit card.

Moreover, the above processes are not automated, nor are they integrated in a uniform environment. In addition, merchants may not have the time or funds available to initiate contact and set up programs for all aggregators and participants. Furthermore, merchants must print, maintain, secure, and account for their paper-based and debit card-based scrip offerings. It is also cumbersome for the not-for-profits to identify merchants, contract with them, track how much money to expect from a certain merchant and verify the amount that the merchant is obligated to pay the not-for-profit. Additionally, purchasers may have to carry with them scrip from a variety of different merchants. Likewise, there is no easy mechanism for the purchaser to keep track of how much money the purchaser has contributed to a respective not-for-profit through this program. Furthermore, the not-for-profit must invest money in carrying a float or inventory of available paper scrip for their supporters and those supporters must pay for scrip up-front and carry their own inventory or investment.

Therefore, there is a need for a more efficient system and method for coordinating and managing the entire process of the rebating by merchants of portions of consumer purchases to consumer-designated organizations, hereinafter referred to as the Collaborative affinity Marketing Program (CAMP).

SUMMARY OF THE INVENTION

The system and method of the present invention automates and facilitate the identification and setting up of the aggregators, participants, and merchants; streamlines transactions between specific merchants and their respective participants related to particular aggregators; and reports related information to appropriate users in a common, secure environment accessible by these users.

In one embodiment, the present invention is a method and system for collaborative affinity marketing including a processor, an aggregator, a participant, and a merchant. The method and system include enrolling with the collaborative affinity marketing by the aggregator, participant, and merchant; assigning a participant identification code to the participant; storing enrollment information of the aggregator, participant, and merchant; providing the participant identification code to the merchant when the participant initiates a purchase transaction with the merchant; storing the participant identification code and amount of purchase transaction by the merchant; sending the stored participant identification code, the amount of purchase transaction, and funds corresponding to a portion of the amount of purchase transaction to the processor; and sending a portion of the funds received by the processor from the merchant to the aggregator. Each processor, aggregator, participant, and merchant has a respective right for accessing the stored information and different portions of the stored information are accessible by the processor, aggregator, participant, and merchant based on their respective access right. Also, the participant is capable of enrolling with the collaborative affinity marketing program while maintaining participant's anonymity.

The participant may enroll with the processor and select the aggregator as a desired aggregator. Alternatively, the participant may enroll with the aggregator, or be automatically enrolled by the aggregator.

In one embodiment, the present invention is a method and system for coordinating and managing rebates by a merchant of a portion of a purchase made by a participant to an aggregator. The method and system include registering with one or more registry by the aggregator, the participant, and the merchant; generating a participant identification code for the participant and a processor identification code for the processor; storing registration information of the processor, aggregator, participant, and merchant; providing the participant identification code and the processor identification code to the merchant, when the participant initiates the purchase with the merchant; storing the participant identification code and amount of purchase transaction by the merchant as sale tracking item; sending the stored participant identification code, the stored amount of purchase transaction, and funds corresponding to a portion of the amount of purchase transaction to the processor based on the stored processor identification code; and sending a portion of the funds received by the processor from the merchant to the aggregator.

BRIEF DESCRIPTION OF THE DRAWINGS

The objects, advantages and features of this invention will become more apparent from a consideration of the following detailed description and the drawings in which:

FIG. 5 is an exemplary flowchart that shows the merchant registration process, according to one embodiment of the present invention;

DETAIL DESCRIPTION

Figure 1:
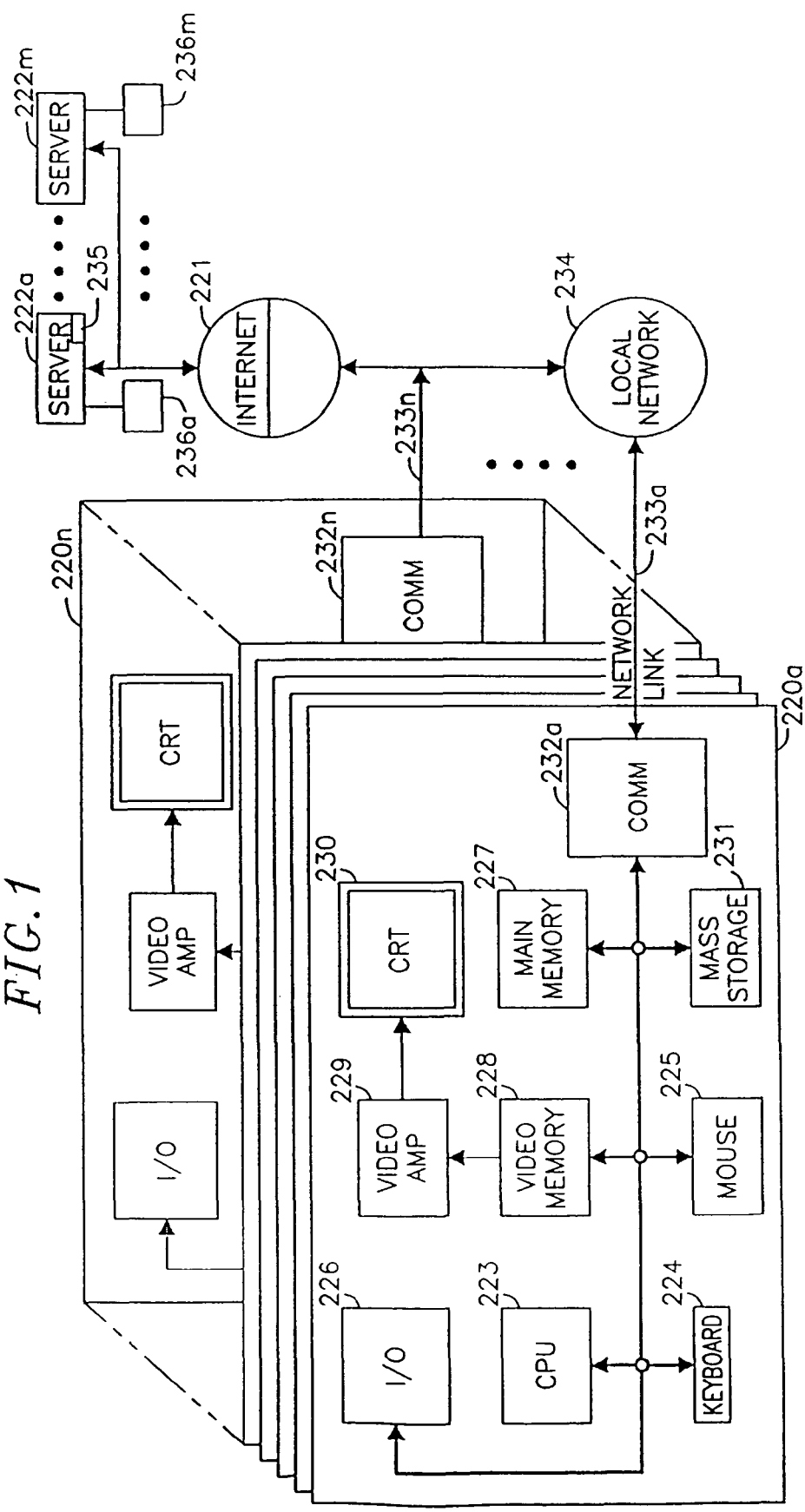
FIG. 1 is a block diagram of a typical Internet client server environment.

The present invention makes the collaborative affinity process more cohesive from start to finish. In one embodiment, the present invention accomplishes this by an Internet-based system and method. The Internet-based computer system and method of the present invention facilitates consistency among all users (aggregators, participants, and merchants) by creating a common environment in a communication network to guide users on all sides of the process. Accordingly, the results are more accurate, timely, complete, and much easier to monitor. Moreover, a greater number of aggregators, participants and merchants can participate in this program due to the advantages over existing programs and the lack of their inherent drawbacks.

In one embodiment, the process of the present invention includes registration with a processor (such as a web site) as an aggregator, participant, or merchant. The registration data are stored in a database on the processor server(s) and are accessible through the processor's web site. Once a respective participant completes a purchase with a registered merchant, the participant's ID number is recorded along with details of the purchase transaction. The respective merchant then sends the related transaction data to the processor. The transmitted data are then processed and reconciled at the processor site and made accessible to authorized users, depending on the users' access levels. The processor then sends a report to a respective aggregator, including all the relevant information for that aggregator. The processor also makes the appropriate payments to respective aggregators.

One embodiment of this invention involves the use of the internet as a means for signing up merchants, aggregators, and participants, for processing their transactions and disseminating benefits and information. The Internet has been popularized by the rapid proliferation of the World Wide Web (WWW or Web). The Web links together a variety of computers around the world and facilitates access to a tremendous variety of topics in a non-sequential web of associations that permits a user to browse from one topic to another, regardless of the format or the order of the topics. Users access and browse the Web using a web browser that generally resides and is executed on the user's computer. Commercially available web browsers such as Netscape's Navigators and Microsoft Internet Explorer™ are very common and accessible by personal computer (PC) users.

The Internet functions based on a client/server model. In this model, a client computer communicates with a server computer on which information resides, and the client computer depends on the server to deliver requested information and services. These services may involve searching for information and sending it back to the client, such as when a database on the Web is queried. Other examples of these services are the delivery of information and web pages through a web site, and the processing of incoming and outgoing e-mail. Typically, the client is a PC user employing a browser to connect to, and search, the servers. The servers (also known as hosts) are usually more powerful computers that house the data and databases. The client/server model enables the Web to be conceived of act as a limitless file storage medium distributed among thousands of host computers, all of which are accessible by any individual PC user.

FIG. 1 shows a block diagram of a typical Internet client server environment used by the processor, aggregator, participant and merchant according to one embodiment of the present invention. PCs 220a-220n, used by aggregators, participants, and merchants, are connected to the Internet 221 through the communication links 233a-233n. Optionally, a local network 234 may serve as the connection between some of the PCs 220a-220n, such as the PC 220a and the Internet 221. Servers 222a-222m are also connected to the Internet 221 through respective communication links. Servers 222a-222m include information and databases accessible by PCs 220a-220n. In one embodiment of the present invention, a participant database, an aggregator database, an analysis database, a merchant database, a transaction history database and a data warehouse (shown in FIG. 4) reside on at least one of the servers 222a-222m and are accessible by the processor, aggregators, participants, and merchants using one or more of the PCs 220a-220n.

In one embodiment of the present invention, each of the PCs 220a-220n typically includes a central processing unit (CPU) 223 for processing and managing data, and a keyboard 224 and a mouse 225 for inputting data. Also included in a typical PC are a main memory 227, such as a Random Access Memory (RAM), a video memory 228 for storing image data, and a mass storage device 231 such as a hard disk for storing data and programs. Video data from the video memory 228 is displayed on the CRT 230 by the video amplifier 229 under the control of the CPU 223. A communication device 232, such as a modem, provides access to the Internet 221. Optionally, one or more of PCs 220a-220n may be connected to a local network 234. An Input/Output (I/O) device 226 reads data from various data sources and outputs data to various data destinations.

Servers (hosts) 222a-222m are also computers and typically have architecture similar to the architecture of PCs 220a-220n. Generally, servers differ from the PCs in that servers can handle multiple telecommunication connections at one time. Usually, servers have more storage and memory capability, and higher-speed processors. Some server (host) systems may actually be several computers linked together, with each handling incoming web page requests. In one embodiment, each server 222a-222m has a storage medium 236a-236m, such as a hard disk, a CD drive or a DVD for loading computer software. When software such as that responsible for executing the processes in FIGS. 1A and 5-21 is loaded on the server 222a, off-the-shelf web management software or load-balancing software may distribute the different modules of the software to different servers 222a-222m. Therefore, in one embodiment, the computer program responsible for executing the present invention resides on one or more servers.

An exemplary web site location 235 is shown on server 222a in FIG. 1. The web site 235 is the user interface (UI) for accessing the databases shown in FIG. 4. The web site 235 has a unique address that is used by the users to access server 222a (in this example) and the web site location on the server 222a. The computer software for executing the processes of the present invention may also reside within the web site 235. In one embodiment, servers 222a-222m are protected by a firewall. The firewall permits a client to communicate with a server system, only if the information packet transmitted by the client system complies with a security policy set by the server system. Thus, the firewall protects the system from unauthorized users on the Internet.

Figure 1A:
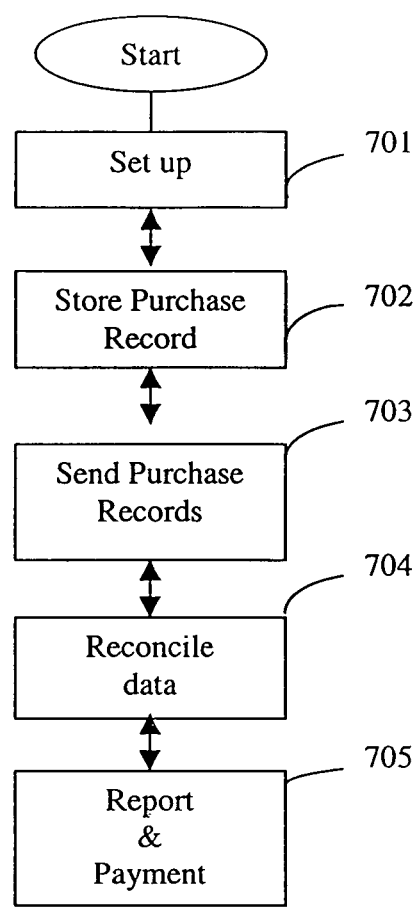
FIG. 1A is an exemplary flow diagram of a computer program executed by one or more computers.

FIG. 1A depicts an exemplary flow diagram of a computer program executed by one or more of servers 222a-222m for one embodiment of the present invention. The computer program generates, applies, and maintains related information about the processor, aggregators, participants, and merchants in a web-based environment. A web site interface provides the UI to the databases shown in FIG. 4 for the respective authorized users. In step 701, all the related users (aggregators, participants, and merchants) are enrolled with the processor using the processor's web site and employing one or more of the PCs 220a-220n and a respective browser. New users may be enrolled with the processor at any time. Participants can register either directly with the processor, or through an aggregator.

When a purchase is made by a participant, the merchant stores the relevant participant's information, including a participant ID number, as shown in step 702. In step 703, the purchase information of one or more participants is transmitted to the processor by the respective merchant. The processor then processes the data received from a plurality of merchants according to each aggregator, each participant, and each merchant. The processor then stores the processed data in a database, as shown in step 704. In step 705, the stored data are made available to respective users with respective access rights. For example, a participant is given access only to information related to that participant. A merchant is not given any information with regard to the aggregator being supported by any particular participant. An aggregator is given access only to information related to that aggregator without disclosure of any private data (for example, where a participant shops and how much the participant spends) concerning any of the aggregator's participants. This scheme ensures the privacy of each user in addition to the security provided by the firewall. That is, the processor has no knowledge of the identity of any "indirect" participant enrolled in the program (see discussion in following paragraph).

Figure 2:
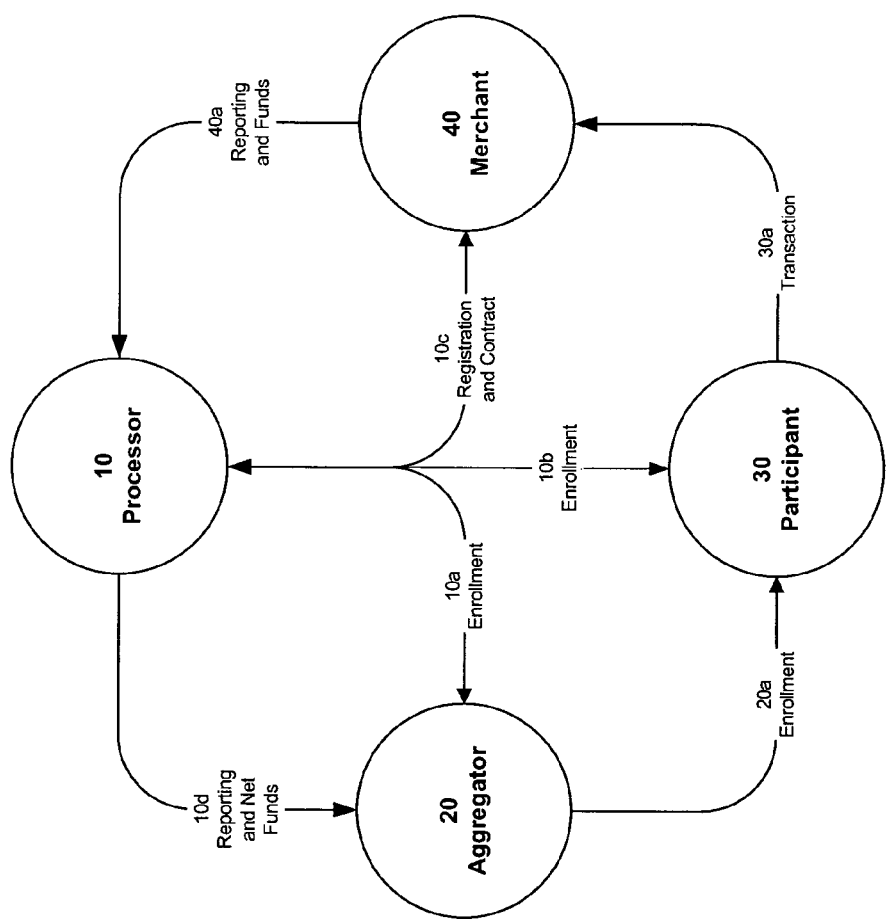
FIG. 2 is an exemplary flowchart depicting the Collaborative affinity Marketing Program (CAMP) process and its four main entities, according to one embodiment of the present invention.

FIG. 2 is a data flowchart depicting the Collaborative affinity Marketing Program (CAMP) process and its four main entities, the processor (10), the aggregator (20), the participant (30) and the merchant (40), according to one embodiment of the present invention. The processor may enroll an aggregator in the CAMP (10a), and the aggregator, in turn, and then enrolls a number of participants who are in some way affiliated with the aggregator (20a). These participants are referred to as "indirect" participants. The processor may also enroll participants directly, these parties being referred to as "direct" participants (lob). The processor also contracts with and registers a number of merchants to participate in the CAMP (10c).

Participants (either direct or indirect) execute a number of purchase transactions with a merchant (30a). The merchant then reports these transactions on a periodic basis to the processor, at the same time transmitting funds or valuable credits that represent a contracted percentage of the total participants' transactions for the period (40a). The processor combines those funds and remits the funds along with detailed reports to the aggregator who enrolled the indirect participant or was designated to receive the funds by a direct participant (10d).

Examples of aggregators include many different not-for-profit organizations such as houses of worship, private and public schools, and social response organizations such as the Sierra Club, and the like. Further examples can fall outside the realm of not-for-profit organizations, such as direct marketer organizations, product distributors, marketing organizations, online marketers, etc.

Figure 3:
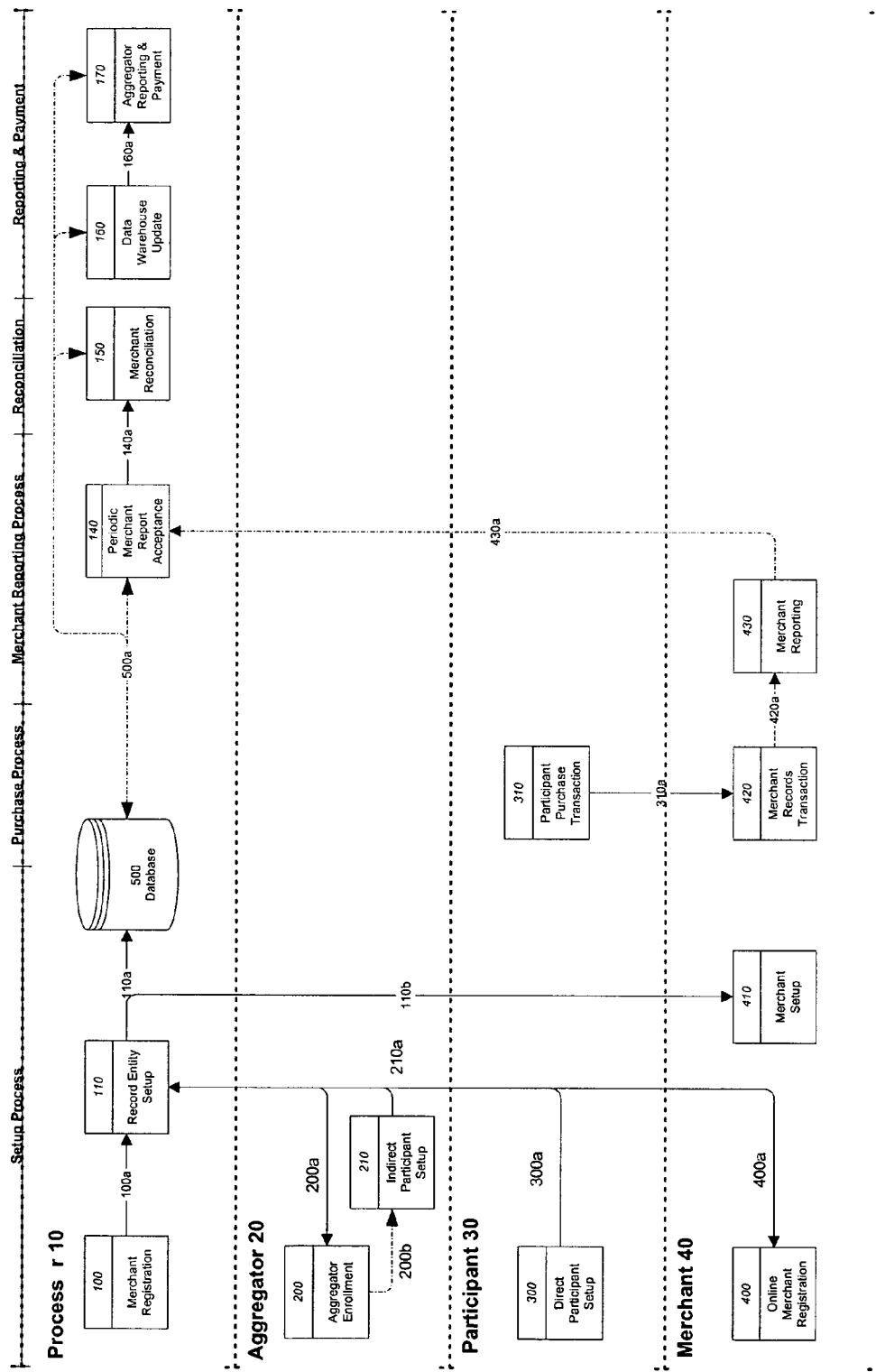
FIG. 3 is an exemplary process flowchart that gives a more detailed presentation of FIG. 2.

FIG. 3 is an exemplary process flowchart that provides a more detailed depiction of FIG. 2. The processor registers each merchant that participates in the CAMP (100). After the initial registration process, the new merchant's information is entered (100a) in the Record Entity Setup process (110). When the merchant information has been verified, the database (500) is updated with the new merchant data (110a) and the information is sent to the merchant (10b) for the internal Merchant Setup (410). In one embodiment, merchants have the option of registering electronically (400), for example, signing up through the Internet. The registration data are then transmitted (400a) to Record Entity Setup (110) and stored (110a) in the database (500).

In one embodiment, aggregators enroll directly with the processor to participate in a CAMP (200). Each aggregator has the option of completing their enrollment by electronic means, or by transmitting paper enrollment forms to the processor (200a). The processor edits and records the aggregator enrollment data (110), and sets up the aggregator in the database (110a). Participant enrollment materials are then sent to the aggregator (200a). The aggregator then enrolls (200b) indirect participants (210), sending selected information regarding those participants to the processor, either electronically or by manually submitted forms (210a).

In one embodiment, participants have the option of taking part in a CAMP by enrolling themselves directly with the processor (thus, being referred to as direct participants (300)), either electronically or manually through the use of forms that are submitted to the processor (300a). Direct participants indicate in their enrollment process the entity (aggregator) that they wish to benefit through their participation in the CAMP.

A participant initiates a Purchase Transaction (310) with a registered merchant in person, over the phone, using the Internet or any other electronic or manual means. During the execution of this transaction, the participant provides his or her participant ID number to the merchant (310a). This number may be provided to the merchant verbally, in writing, or through electronic or any other means, such as a card or fingerprint of the participant to be scanned by the merchant. The participant ID code is recorded along with details of the transaction on the merchant's manual or automated point-of-sale or sales system (420). In one embodiment, the present invention provides an easy and efficient way to interface to existing merchant data-handling and/or sale tracking systems. In this embodiment, the participant ID code is recorded as an item in the existing merchant's system and thus eliminating the need for a new system or software by the merchant.

Participant ID code maybe a fingerprint or retina scan of the participant. Alternatively, the Participant ID code maybe a smart card, a Radio Frequency Identification card (RFID), or similar identification means.

A smart card includes an embedded integrated circuit chip that can be either a microcontroller with internal memory or a memory chip alone. The card connects to a reader through direct physical contact or a remote contactless electromagnetic interface. With an embedded microprocessor, smart cards have the unique ability to store large amounts of data, perform on-card functions (e.g., encryption and digital signatures) and interact intelligently with a smart card reader. A smart card ID can combine several ID technologies, including the embedded chip, visual security markings, a magnetic stripe, a barcode and/or an optical stripe. An RFID card is a variation of smart card that transmits (and receives) ID information via a wireless communication means.

On a periodic basis, the merchant, combining all accumulated participant transactions executed during the period (420a), sends a periodic merchant report (430) to the processor by manual, electronic or any other means (430a).

Figure 9:
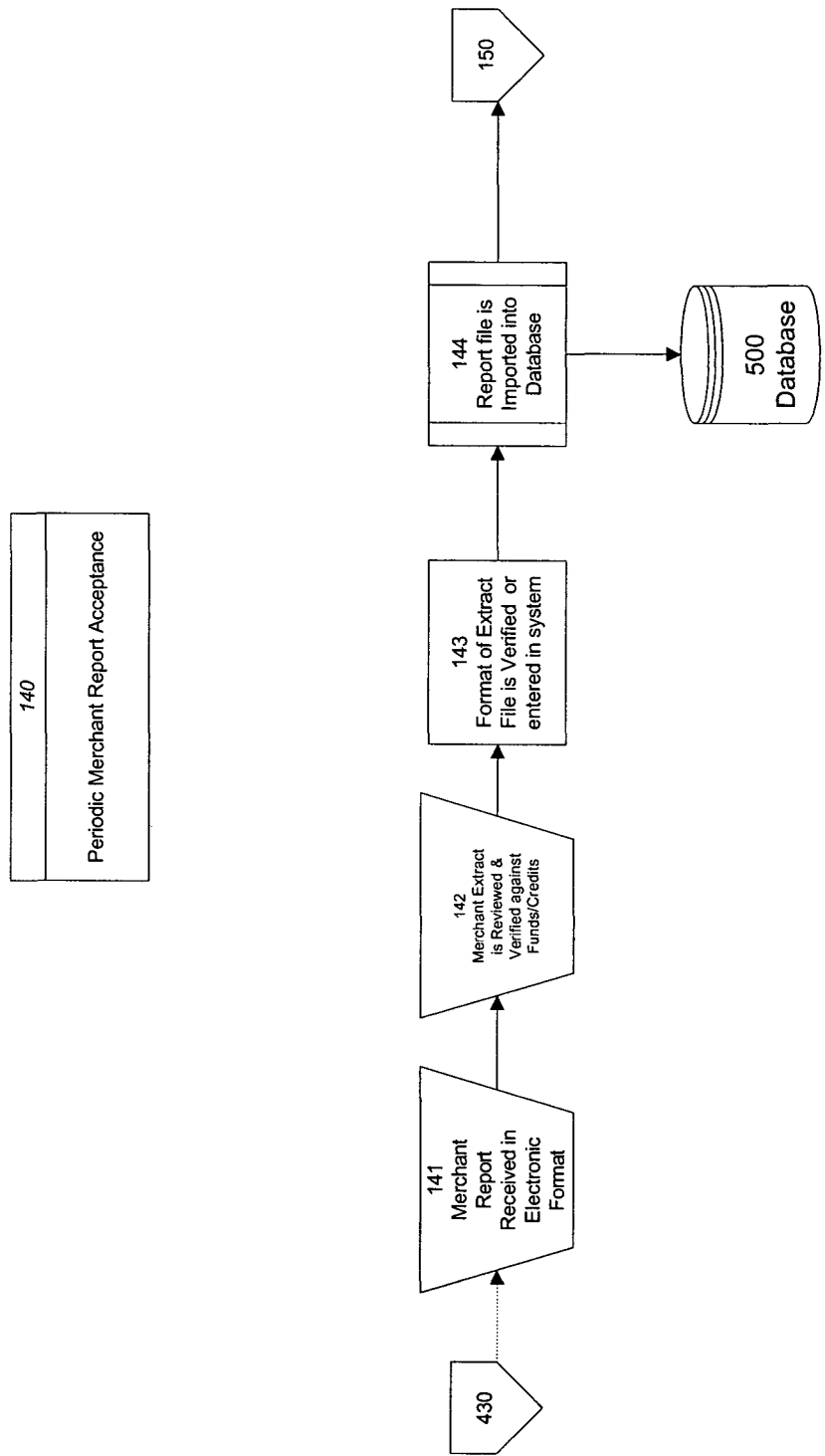
FIG. 9 is an exemplary flowchart depicting the acceptance of a periodic merchant report acceptance, according to one embodiment of the present invention.

Upon receipt of the periodic merchant report by the processor (140), certain tasks are undertaken to review and verify the data provided in the merchant report. For example, as shown in FIG. 9, the merchant report is reviewed and verified against funds received (142) and format of the report file is verified (143). The file is then stored in the processor database (144). The processor database (500) tracks merchants, aggregators, participants, their inter-relationships, and transaction history for each of them.

Figure 10:
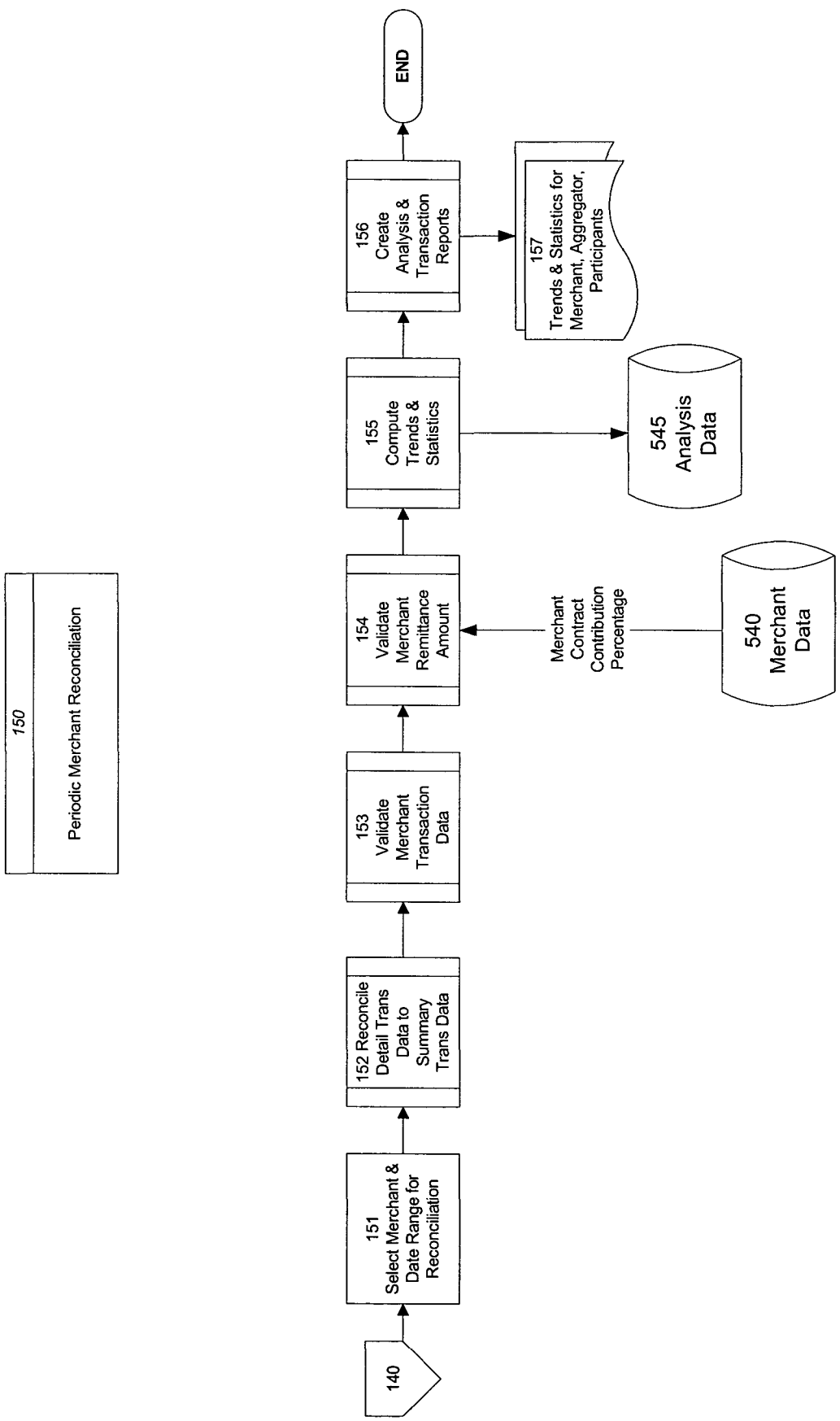
FIG. 10 is a flowchart showing the process for the reconciliation of the periodic merchant report, according to one embodiment of the present invention.

Referring back to FIG. 3, after a merchant report has been accepted and entered into the database (500), the process continues with the merchant reconciliation (140a and 150), while various validations take place on the data stored in the database (500). For example, as shown in FIG. 10, merchant and data range are selected for reconciliation (151) and then detail transaction data are reconciled to a summary transaction data (152). The merchant transaction data is then validated by the remit amount (153). The merchant remittance amount is then validated using the merchant contribution percentage (154). Trends and statistics are computed (155) and stored (155) in an Analysis Database 545. The analysis and transaction reports are then created (156).

Figure 11:
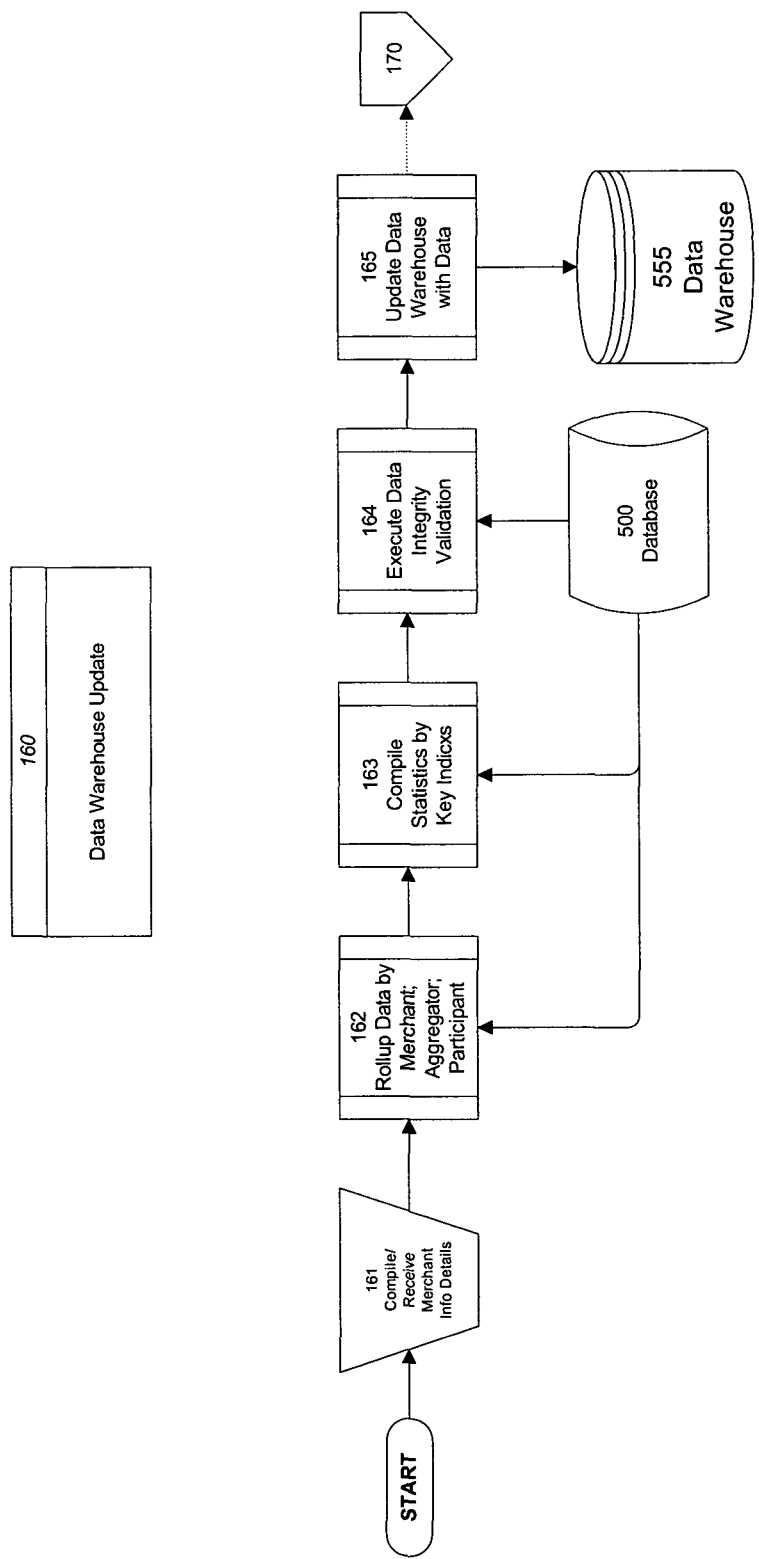
FIG. 11 is an exemplary flowchart illustrating compilation of statistics in a database and the updating of a data warehouse, according to one embodiment of the present invention.

When new merchant transaction data have been validated and reconciled, the data are available in the database (500) to be analyzed for trends, statistics and demographics. The data are further used for internal reports by the processor and are loaded into the Data Warehouse (555), as shown in FIG. 11. After the Data Warehouse (555) has been updated with merchant transactions (160), the data become available for review by the aggregator, the participant and the merchant. Each can access the raw data and analyses data specific to transactions that are relevant to them. Aggregators, participants and merchants can view data electronically (over the Internet, for example), or can request reports from the processor. When new merchant transaction data are available in the Data Warehouse (555), the data are included in the next aggregator report prepared by the processor (160a). On a periodic basis, the processor prepares a report for the aggregator that includes all unreported merchant transaction data since the prior report (170). In conjunction with the issuance of this report, the processor effects a payment or transfer of credit to the aggregator by manual, electronic or other means.

Figure 4:
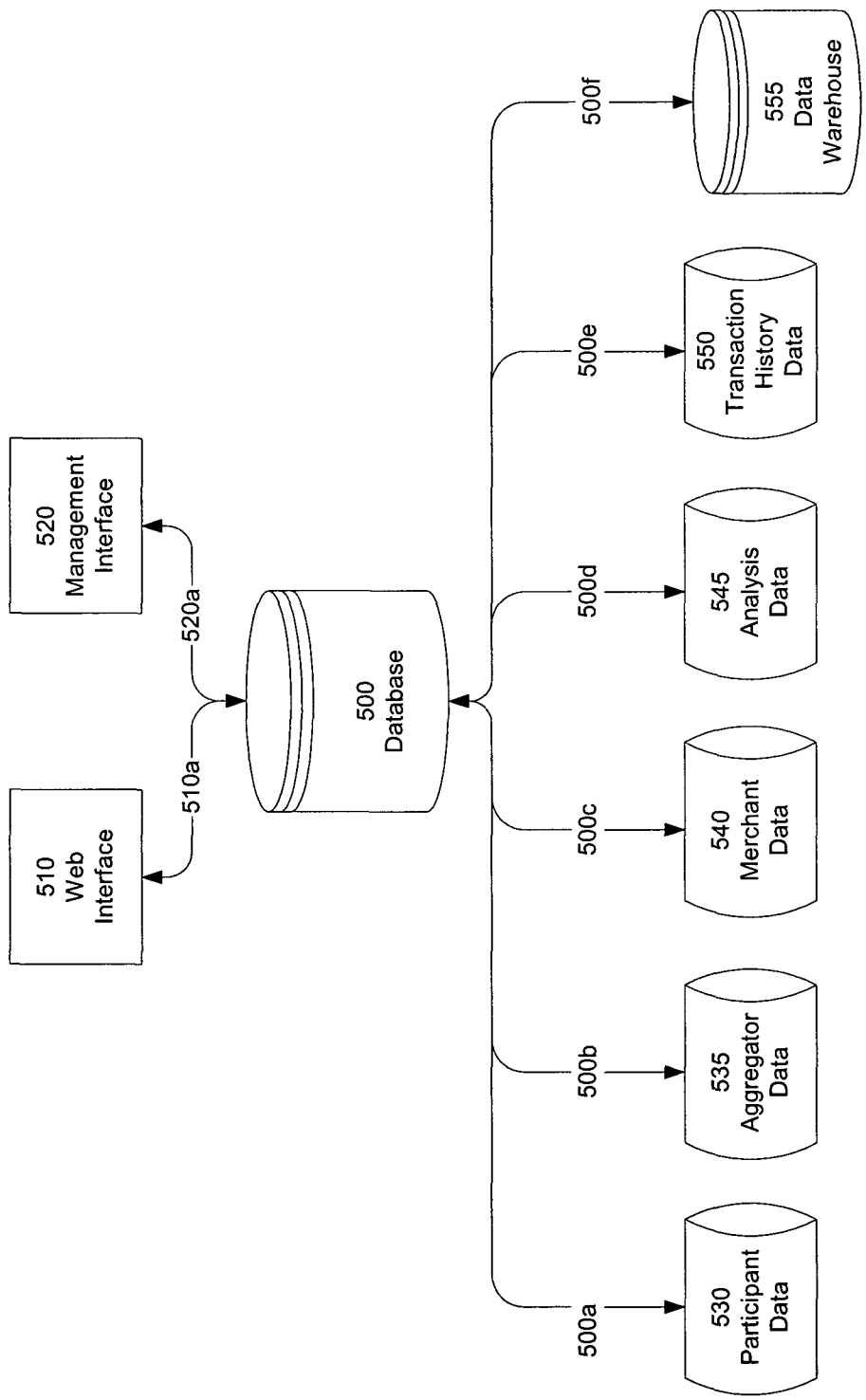
FIG. 4 is an exemplary flow chart diagram depicting the linkage between the databases and key data classes, or entities, according to one embodiment of the present invention.

FIG. 4 depicts the linkage between the databases (500, 555) and key data classes, or entities. After merchants are registered with the system of the present invention (100, 400) and then recorded (110), their setup data are entered (510, 520) and stored in Merchant Data (540) within the database (500) (500c). After an aggregator is enrolled (200) and recorded in step 110, the aggregator data are entered and stored (510, 520) in Aggregator Data (535) within the database (500) (500b). After participants are set up in the CAMP system (210, 300), their data are recorded (110) and entered and stored (510, 520) in the Participant Data (530) within the database (500) (500a).

In the Periodic Merchant Report Acceptance (140) process, merchant transactions data are stored in Transaction History Data (550) within the database (500) (500e). As part of the Merchant Reconciliation, all transactional data and the manner in which they relate to merchants, aggregators and participants are analyzed with respect to trends, statistics and demographics and stored in Analysis Data (545) within the database (500) (500d).

In the Aggregator Reporting and Payment Process (170), the Data Warehouse (555) facility is updated with transaction data, trends, statistics and demographics (500f) and made available to CAMP entities through database inquiry and reports requested through Web site Interface (510) and Management Interface (520) (510a, 520a). Although Participant Data, Aggregator Data, Merchant Data, Analysis Data, and Transaction History Data are part of the processor database (500) in the above described exemplary embodiment, one skilled in the art should realize that one or more of the above-mentioned data may reside in one or more separate databases.

Figure 4A:
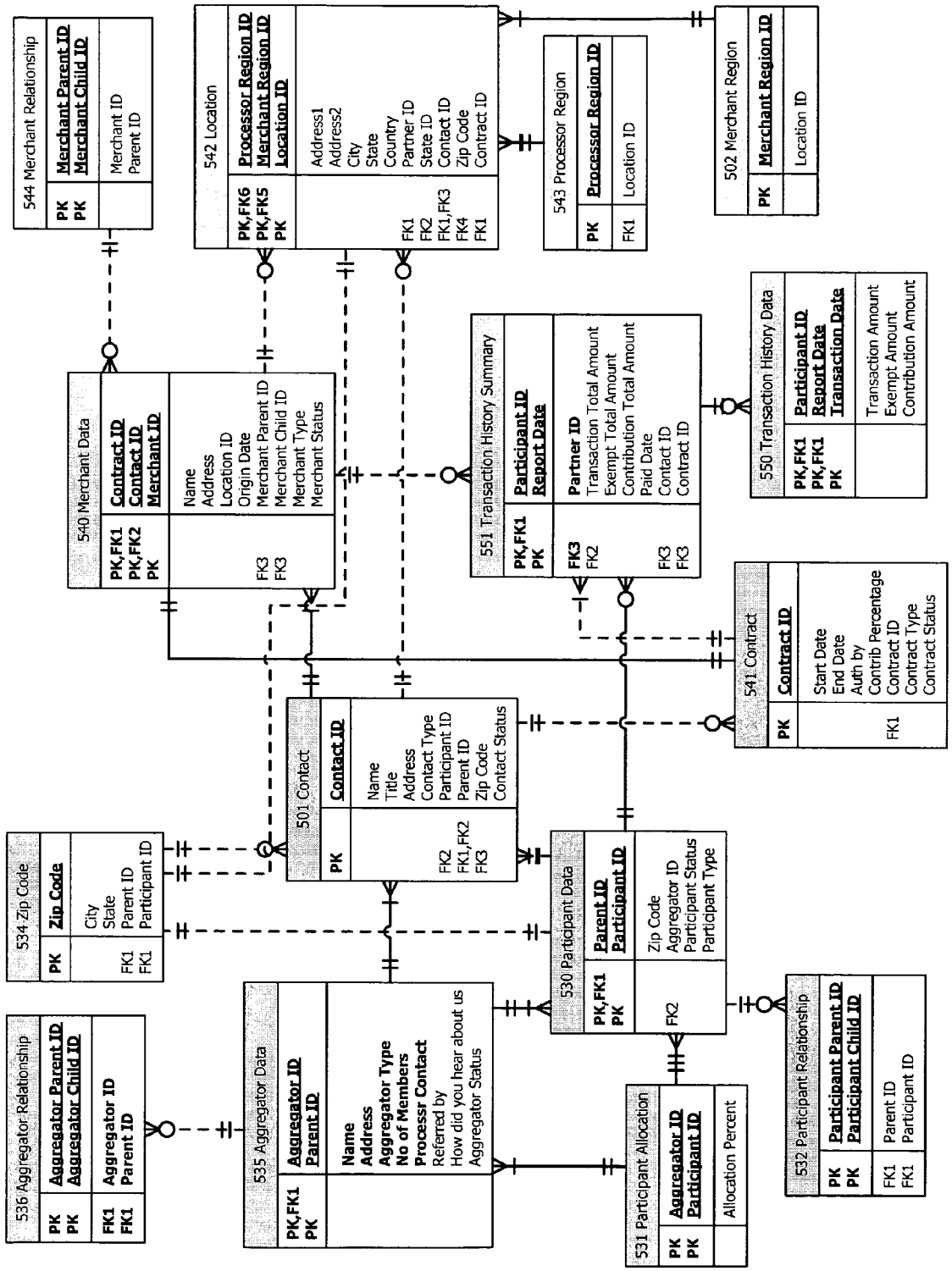
FIG. 4A is an entity relationship diagram in which data can be stored and accessed in a logical manner, according to one embodiment of the present invention.

FIG. 4a is an Entity Relationship diagram that depicts one embodiment of the present invention in which data can be stored and accessed in a logical manner. The connecting lines provide definitions of each of the logical relationships among and between the four main entities of the CAMP, as well as other supporting data entities. The Aggregator Data (535) table provides basic Aggregator information. Because aggregators can be associated with one another, the Aggregator Relationship (536) table provides for a series of parent-child (parent-subsidiary) relationships. The Participant Allocation (531) table provides for a many-to-one relationship between participants and aggregators, enabling direct participants to allocate any portion of the funds or credits in the Reporting and Net Funds process (10d) between or among multiple aggregators.

The Participant Data (530) table provides for the storage of essential information regarding a participant. Several other tables provide for multiple relationships between this Participant Data (530) table and other data entities in the database. The Participant Relationship (532) table provides for a series of parent-child (parent-subsidiary) relationships for associating related participants.

The Transaction History Data (550) table and the related Transaction History Summary (551) table provide for storage of historical data regarding a participant or series of participants associated by the parent-child relationship defined in the Participant Relationship (532) table. The Transaction History Data (550) table and the related Transaction History Summary (551) table also provide for the storage of historical data regarding an aggregator or related aggregators, as defined in the Aggregator Relationship (536) table.

The Merchant Relationship (544) table provides for a series of parent-child (parent-subsidiary) relationships for associating related merchants. The Merchant Data (540) table provides for the storage of essential information regarding a merchant and the Contract (541) table provides additional information on the merchant and their contractual agreement with the processor. Several other tables provide for multiple relationships between this Merchant Data (540) table and other location tables in the database. The Location (542) table provides for multiple locations of any merchant. The existence of the two region tables (543, 502) and their relationship to the Location (542) table, the Merchant Relationship (544) table and the Merchant Data (540) table, provides the ability to report by merchant location, merchant region or processor region.

Tables 502, 542, 543 and 534 and their interrelationships, as well as their relationships with Participant Data (530) and Merchant Data (540), provide for a comprehensive statistical analysis and reporting on the Transaction History Summary (551) and Transaction History Data (550) by any of the aforementioned tables. The relationship between participants and aggregators, described above, provides for any of the above reporting by participant and by aggregator. The Contact (501) table is a common data-store for contact of any type, whether aggregator, participant or merchant.

FIG. 5 is an exemplary flowchart that shows the merchant registration process (100). Merchant registration materials are received and compiled (101) and undergo review (102), entry in the system (103), and editing and validation of data (104). If data omissions or errors exist, they are reported (104a) to the user for correction and re-processing (102, 103 and 104). After data has been validated, merchant status becomes a pre-registered, all data is stored in the database (500) and a merchant contract is printed (106). Merchant Setup materials including registration information, documentation and materials, are then combined with the merchant contract, (106) assembled (107), and submitted to the merchant for review and signature.

Figure 6:
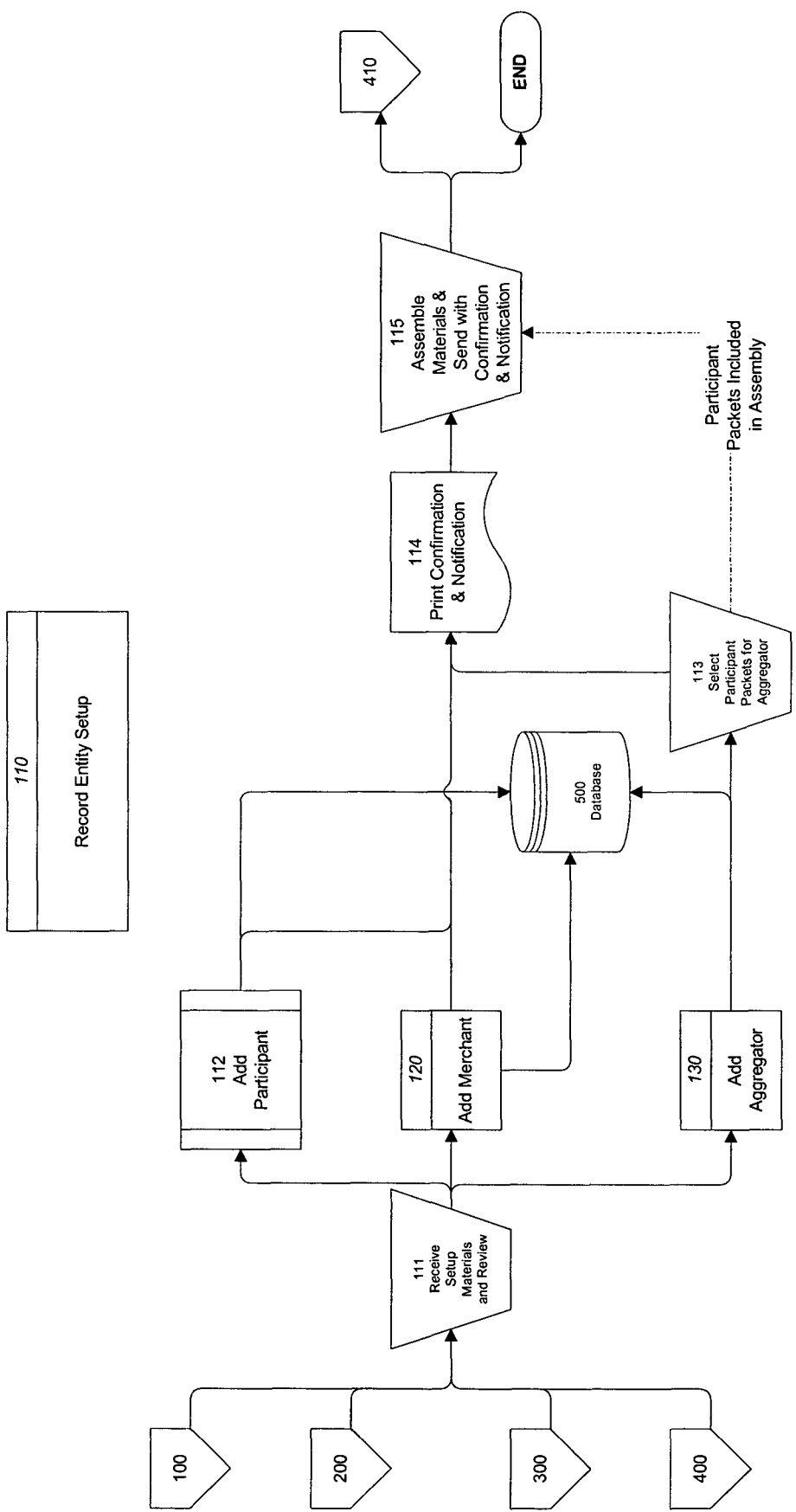
FIG. 6 is an exemplary flowchart that illustrates the recording of a key entity, aggregator, participant, or merchant, according to one embodiment of the present invention.

FIG. 6 is an exemplary flowchart illustrating the recording of a key entity (110), aggregator (20), participant (30), or merchant (40) according to one embodiment of the present invention. Setup materials are received from the merchant registration process (100), an aggregator registration (200), a direct participant registration (300), or merchant (400) registration and reviewed for completeness (111).

If the materials pertain to a direct participant, detailed participant data is entered (112), and updated in database (500). If the materials pertain to an aggregator (200), detailed aggregator data is entered (130), participant packets are selected (113) for the requested number of indirect supporters by the aggregator, and all data is stored in database (500). If the materials pertain to a merchant (400), merchant detailed data is added (120), and updated in database (500). The applicable confirmation and notification is printed (114) and all materials relevant to the aggregator (20), participant (30), or merchant (40) are compiled and submitted to that entity (115).

Figure 7:
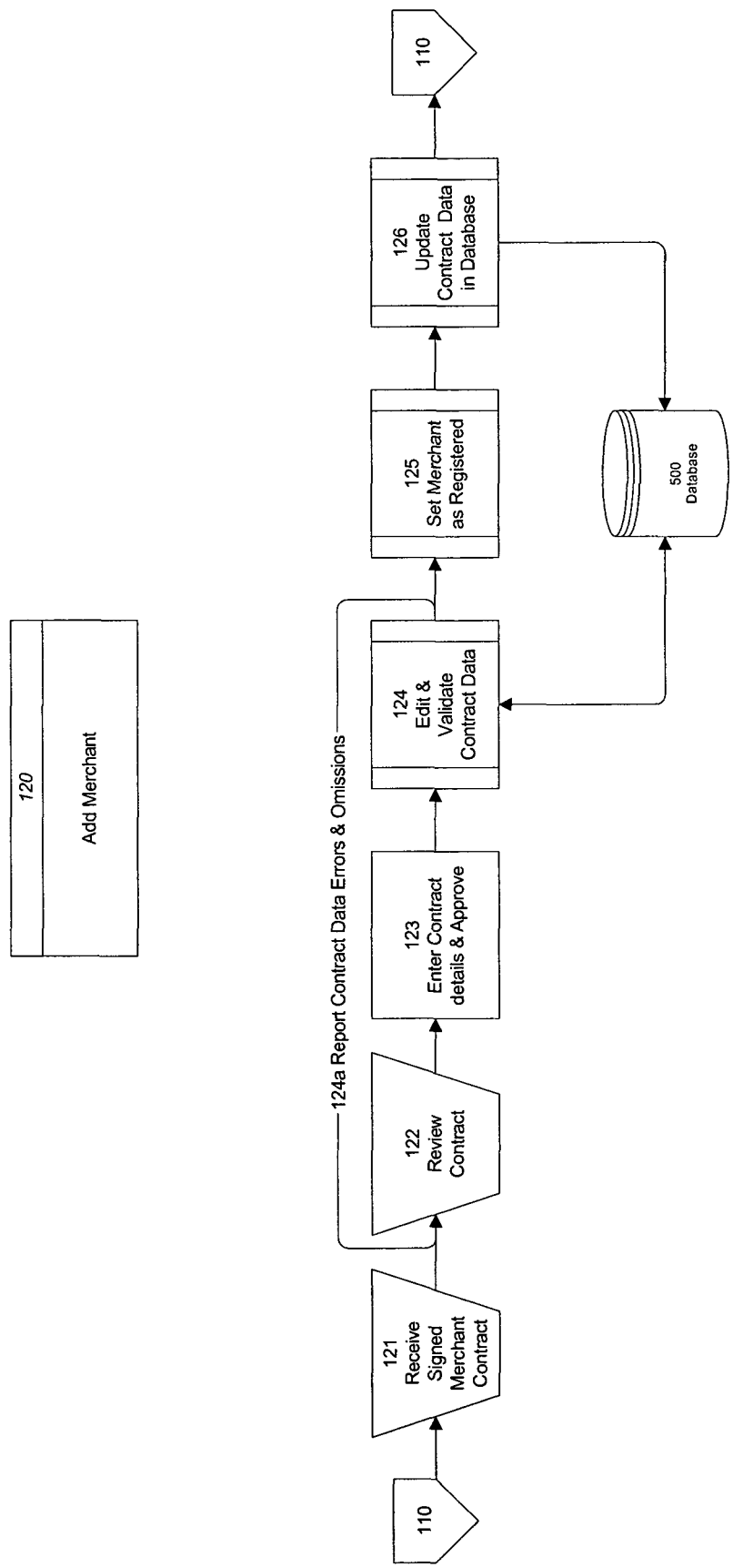
FIG. 7 is an exemplary flowchart that depicts the adding of a merchant, according to one embodiment of the present invention.

FIG. 7 is a flowchart that depicts the adding of a merchant (120), according to one embodiment of the present invention. The processor (10) receives (121) a signed contract (106 in FIG. 5) from the merchant (40). The contract is then reviewed for completeness (122) and contract details are recorded and if complete, the contract is approved (123), the data is further edited and validated (124) against the database (500). If there are any errors or omissions, they are reported (124a) back to the user for correction and re-entry. If there are no errors or omissions, the merchant is set with a "registered" status (125) and contract signing and status are recorded (126) in database (500).

Figure 8:
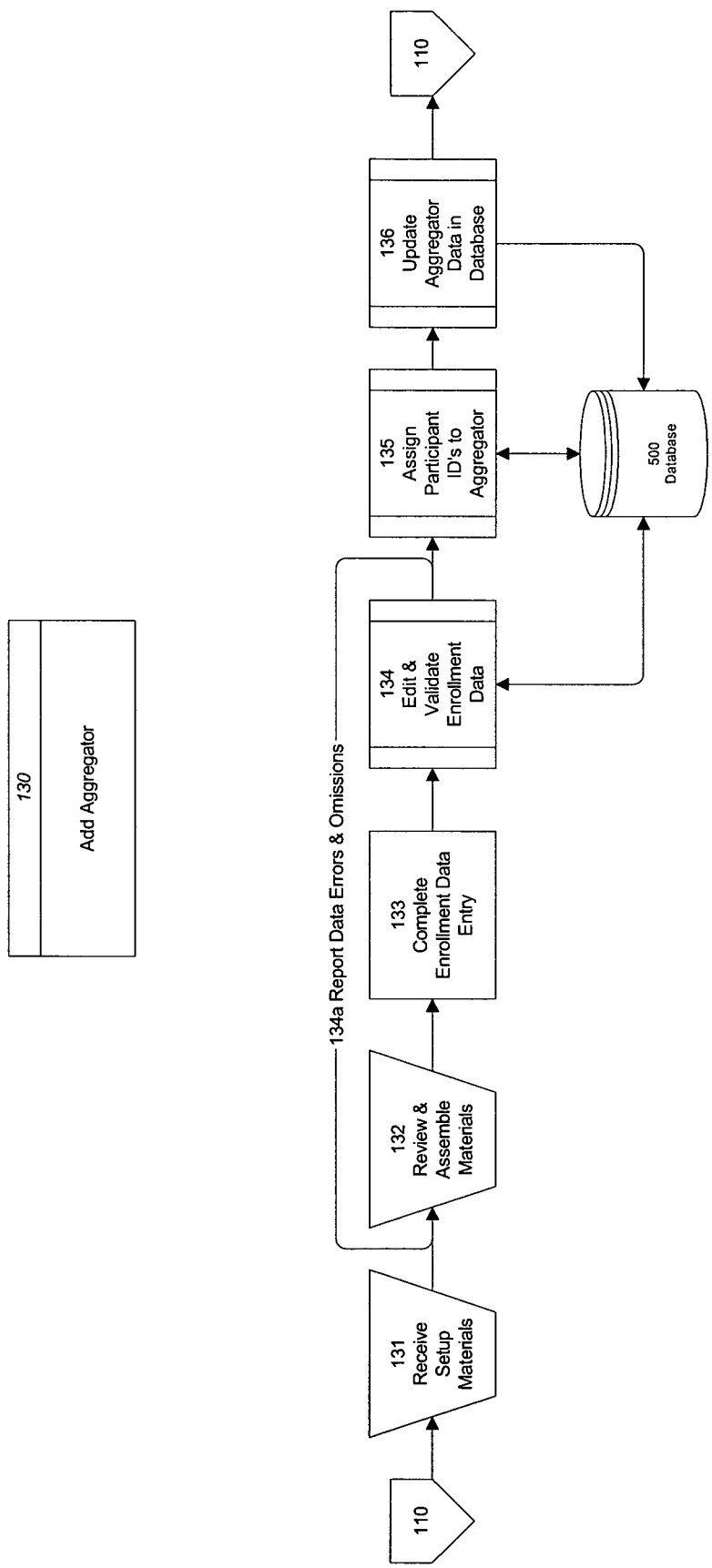
FIG. 8 is an exemplary flowchart that shows the adding of an aggregator, according to one embodiment of the present invention.

FIG. 8 is an exemplary flowchart that shows the adding of an aggregator (130), according to one embodiment of the present invention. The processor (10) receives setup materials and completed enrollment form (131) from the aggregator (20) and review the materials and form for completeness (132). Aggregator data is entered (133), and the data is further edited and validated (134) against the database (500). If there are any errors or omissions they are reported (134a) back to the user for correction and re-entry. If there are no errors or omissions, the data is recorded in database (500). Participant identification (ID) numbers (codes) are assigned to the aggregator (135) and recorded in the database (500). All other aggregator data is also recorded (136) in the database (500).

FIG. 9 is an exemplary flowchart depicting the acceptance of a periodic merchant report. The periodic merchant report is received in electronic format (141), according to one embodiment of the present invention. The report can be received in by any number of different means, including paper, email, diskette, or CD. Subsequently the report is reviewed and verified against the funds received from merchant (142), and the format of the electronic report is verified or entered in the system (143). The merchant report file is imported (144) into database (500) and the database is updated. The processor database (500) tracks merchants, aggregator and participants, their inter-relationships and transaction history for each entity.

FIG. 10 is a flowchart showing the process for the reconciliation of the Periodic Merchant Report (150), according to one embodiment of the present invention. The reconciliation process is initiated by selecting a merchant (40) and an applicable date range to be reconciled (151). Detail transaction data is reconciled to summary transaction data (152) by comparing the detail line items and amounts to the summary data by participant and merchant location. Transactions are then validated against merchant remittance amounts (153). Merchant summary, detail and financial information are also validated against the contract percentage from the database (500) among merchant data (540) (154). Statistical data relating to transactions and trends are stored in the database (500) among analysis data (545) (155). Analysis and transaction reports and statistics by merchant, aggregator and participant are computed (156) and reports created (157).

FIG. 11 is a flowchart illustrating compilation of statistics in a database (500) and the updating of a data warehouse (555) (170), according to one embodiment of the present invention. The process is initiated by the receipt and compilation (161). A data rollup process (162) is performed on data in database (500) to index totals and sort data into an efficient format for warehousing. Additional statistics and key indices are compiled (163), and additional data integrity validation (164) takes place on the database (500) to ensure against data anomalies. Next the rollups, statistics, computation, and indices (162, 163, and 164) are updated (165) and stored in the data warehouse (555).

Figure 12:
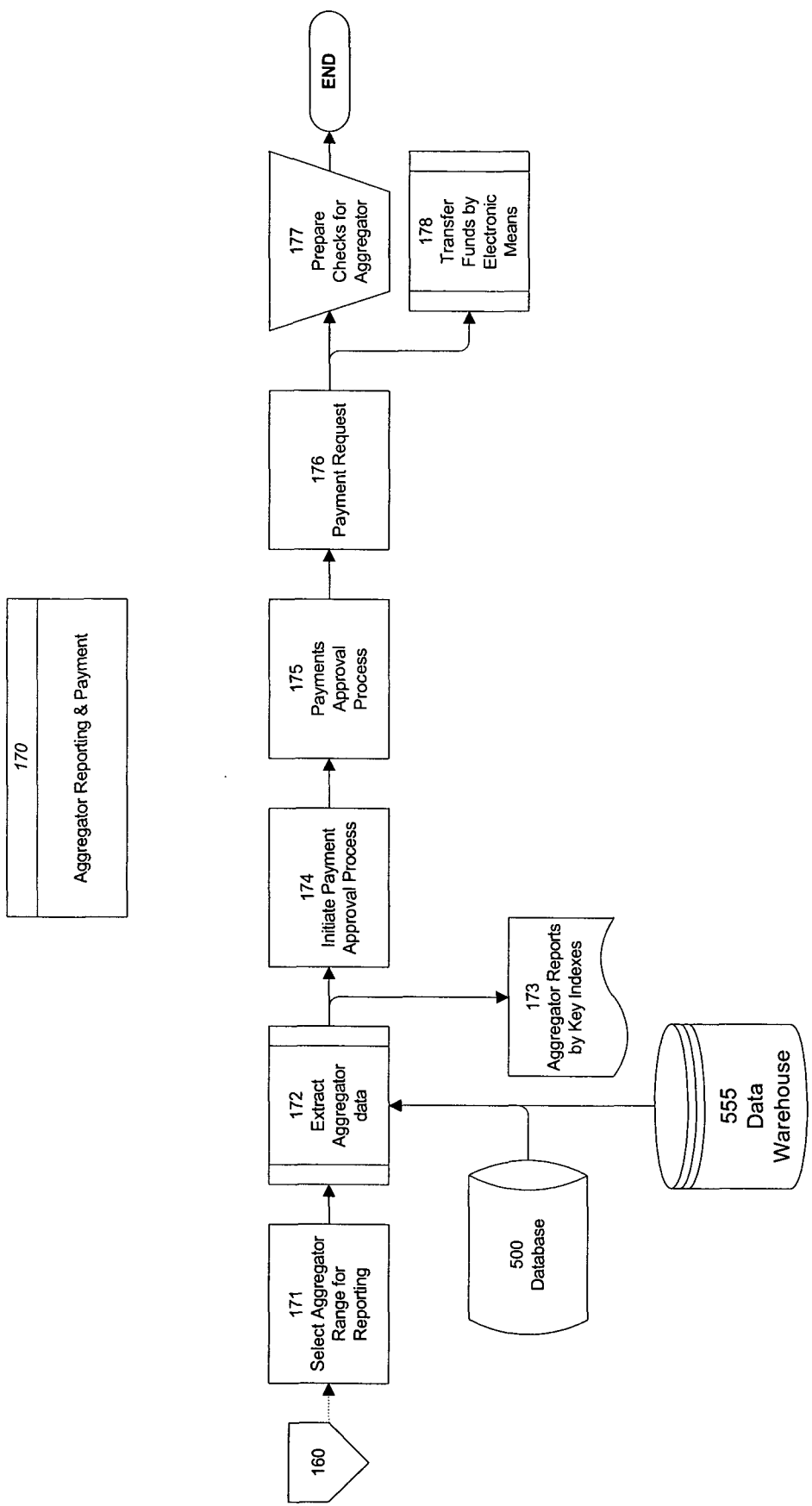
FIG. 12 is an exemplary flowchart diagram showing the preparation of aggregator reports and payments to an aggregator by the processor, according to one embodiment of the present invention.

FIG. 12 is an exemplary flowchart diagram showing the preparation of aggregator reports and payments (170) to an aggregator (20) by the processor (10). The process is initiated by selecting an aggregator or a group of aggregators for reporting (171). An extract process is run selecting aggregator (172) data from the database (500) and data warehouse (555). Aggregator reports (173) are then generated which may be ordered by key indices and including relevant statistics. According to one embodiment of the present invention, the reports can be generated in electronic or hardcopy format. When reports are produced, the aggregators are selected (174) for payment approval and undergo the payment approval process (175). All aggregators approved for payment have payment requests (176) processed and checks printed (177). According to one embodiment of the present invention, an electronic funds transfer (178) or other electronic means of payment can be used.

Figure 13:
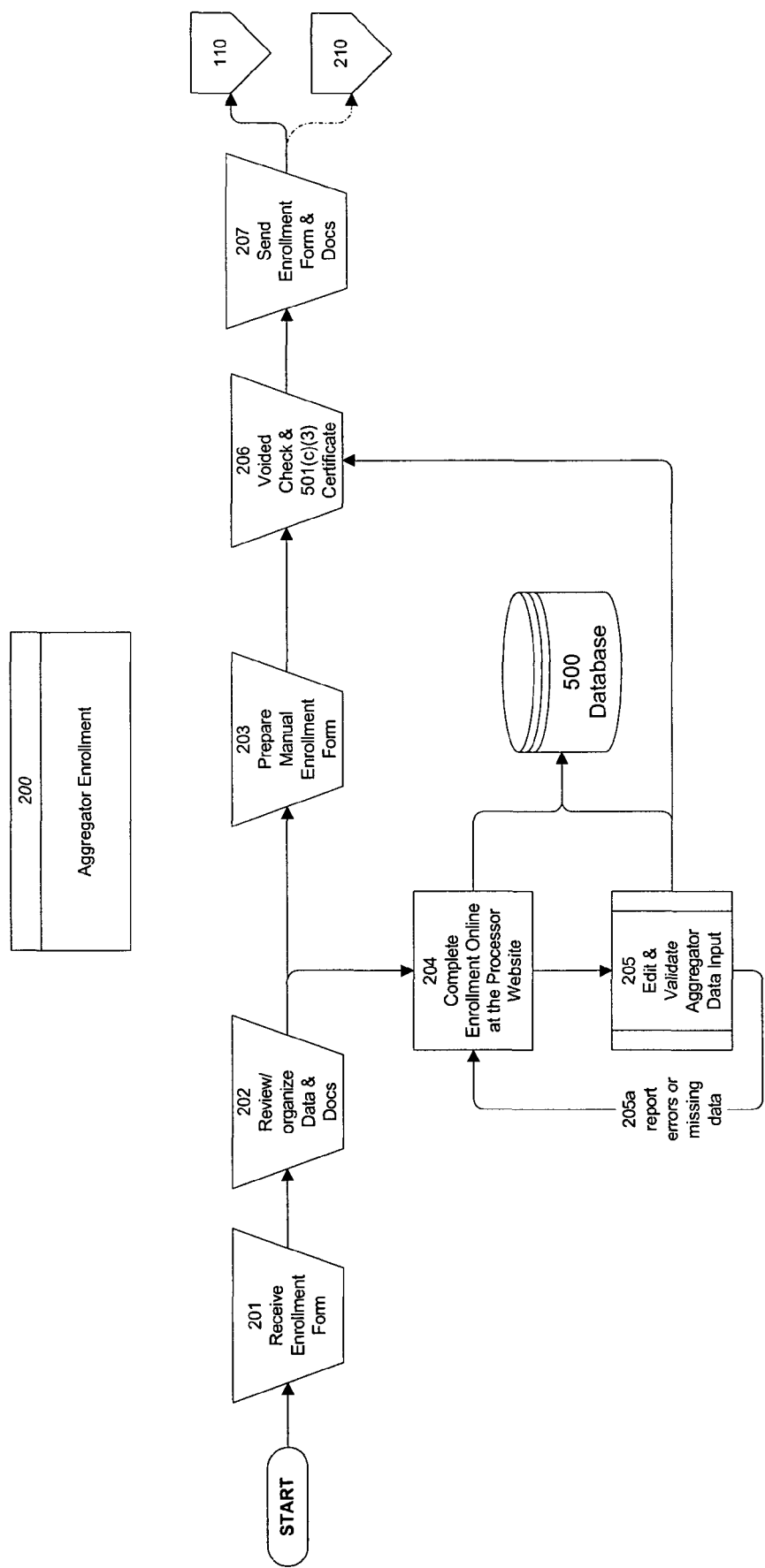
FIG. 13 is an exemplary flowchart that shows the setup and enrollment of an aggregator, according to one embodiment of the present invention.

FIG. 13 is an exemplary flowchart that shows the setup and enrollment (200) of an aggregator. The aggregator receives the enrollment forms from the processor (201), reviews the forms and organizes (202) the necessary information and documentation to complete the enrollment process. The aggregator enrollment data includes:

1. Name/Address/Key Contacts
2. Member Type
3. Number of Members
4. Annual Membership Growth Rate
5. Website URL
6. Affiliations
7. Parent Organization
8. Bank Information
9. Tax ID
10. Copy of 501(c)(3) Certificate
11. Referred by Contact
12. Processor Contact
13. "How did you hear about us" indicator An aggregator has the option of completing the enrollment online through the processor website (204) or by completing the enrollment forms manually (203) and submitting them to the processor. If the aggregator uses the online option, he/she completes enrollment online (204) and the data is edited and validated (205). The aggregator is then advised of any errors or missing information (205a). When the enrollment is complete the data is stored in database (500). Whether the enrollment is accomplished manually or by way of the website, the aggregator signs the forms and selects a voided check and a copy of a certification (206) and sends the enrollment forms and other documentation (207) to the processor.

Figure 14:
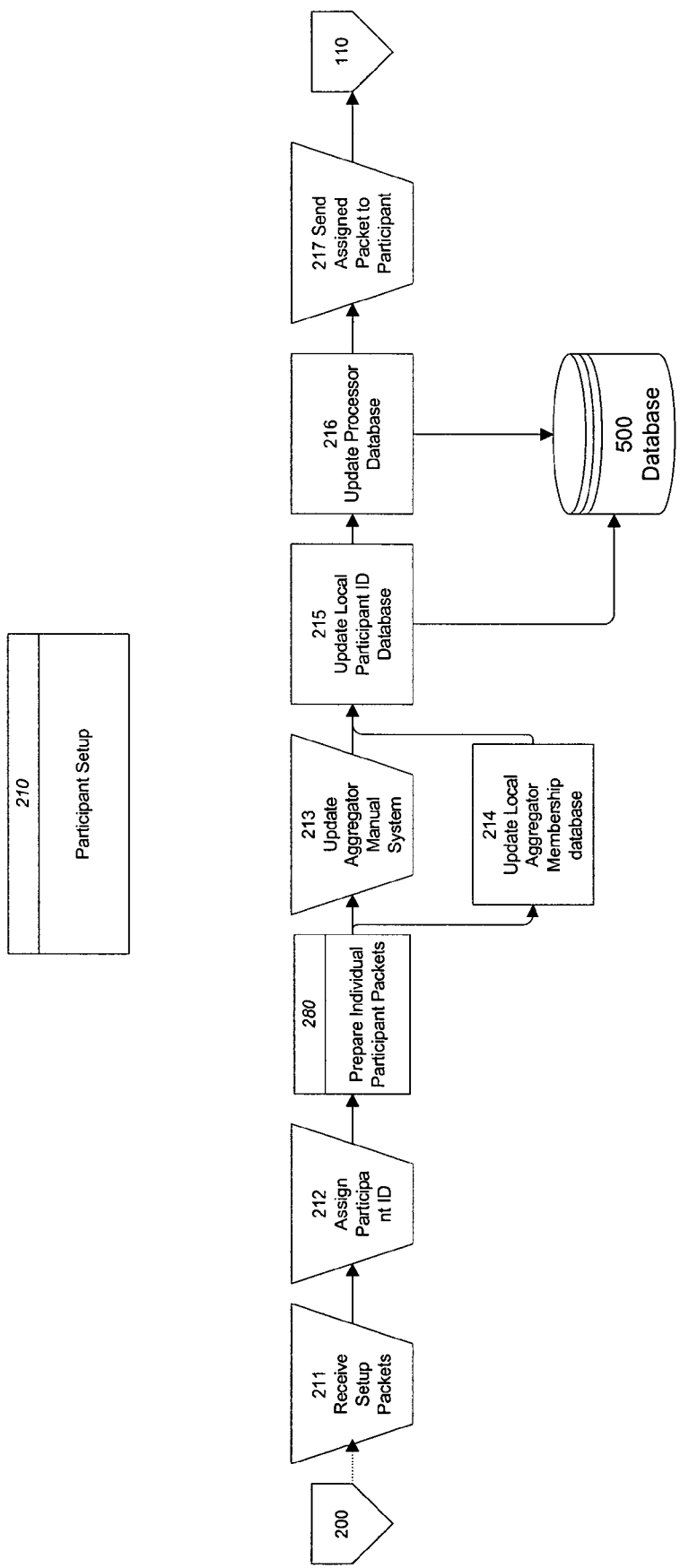
FIG. 14 is an exemplary flowchart-depicting setup of a participant by an aggregator, according to one embodiment of the present invention.

FIG. 14 is an exemplary flowchart depicting setup of a participant (210) by an aggregator, according to one embodiment of the present invention. The aggregator receives the setup packets (211) from the processor upon a successful enrollment (200). The aggregator assigns each participant a participant ID number (code) (212) and prepares the individual participant packets (220) for distribution to the respective participants. After the participants have been assigned (212) ID numbers and the packets are prepared (220), the aggregator makes a record of participants with their corresponding ID numbers.

This is accomplished by updating aggregator's own manual system (213) or by updating aggregator's own automated membership system (214) and by storing the data in a local participant database (215) provided by the processor. The processor database (500) is updated (216) with participant ID only by communicating with the local participant identification database (215), printing a report and sending it to the processor, by entering the data using the online website at the processor, or by sending an electronic file with the data to the processor. The data transmitted to the processor includes the home zip code of the participant and the ID number assigned. The aggregator then sends the assigned packet to each participant (217).

Figure 15:
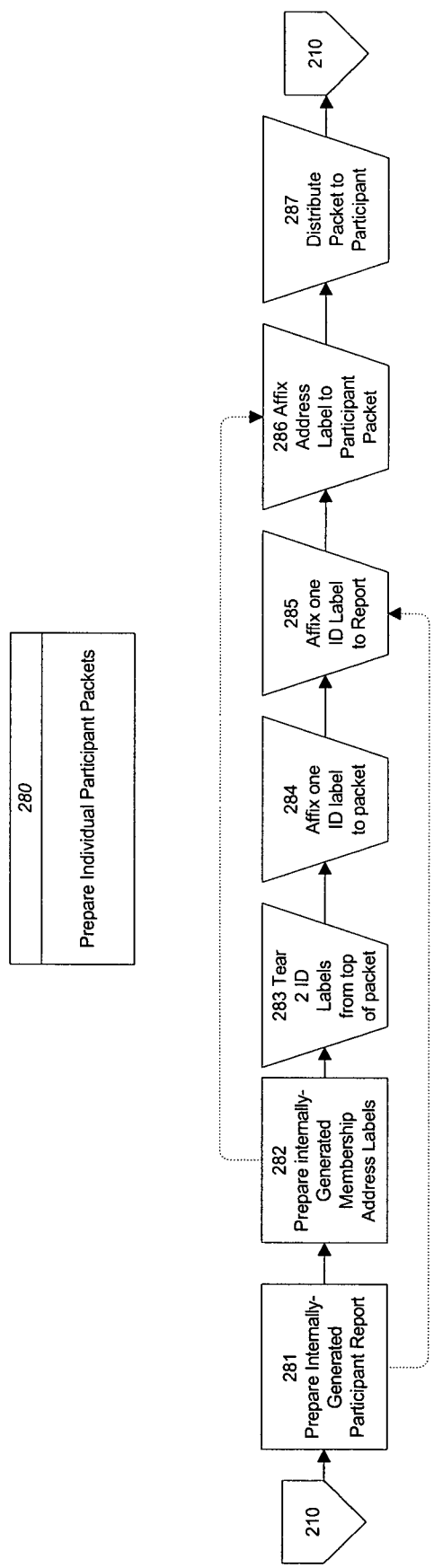
FIG. 15 is an exemplary flowchart that shows the step-by-step process of an aggregator preparing individual participants packets, according to one embodiment of the present invention.

FIG. 15 is an exemplary flowchart that illustrating the step-by-step process of an aggregator preparing individual participants packets (280), according to one embodiment of the present invention. Custom-designed packaging to facilitate manual processing of Participant Packets are provided by the processor. Envelopes are pre-stuffed with necessary materials for the participants and Tabs with peel-off Participant ID labels and the tabs prevent closure of envelope prior to their removal and use in the process. Aggregators need not keep track of which participant has been assigned which identification number but it is in their best interest to do so because this provides them with the ability to track which participant is generating funds.

In one embodiment of the present invention, the aggregator prepares an internally generated participant report (281) and prepares internally generated participant address labels (282) from the member records. The aggregator than tears two identification number labels (283) from the top of the participant packet; affixes one label (e.g., blue) to the front of the packet (284) and a second label (285) (e.g., red) to the membership report (281). They affix (286) the membership address label (282) to the participant packet. The aggregator then completes packets for all participants and distributes (287) them to the assigned participant by mail or any other means.

Figure 16:
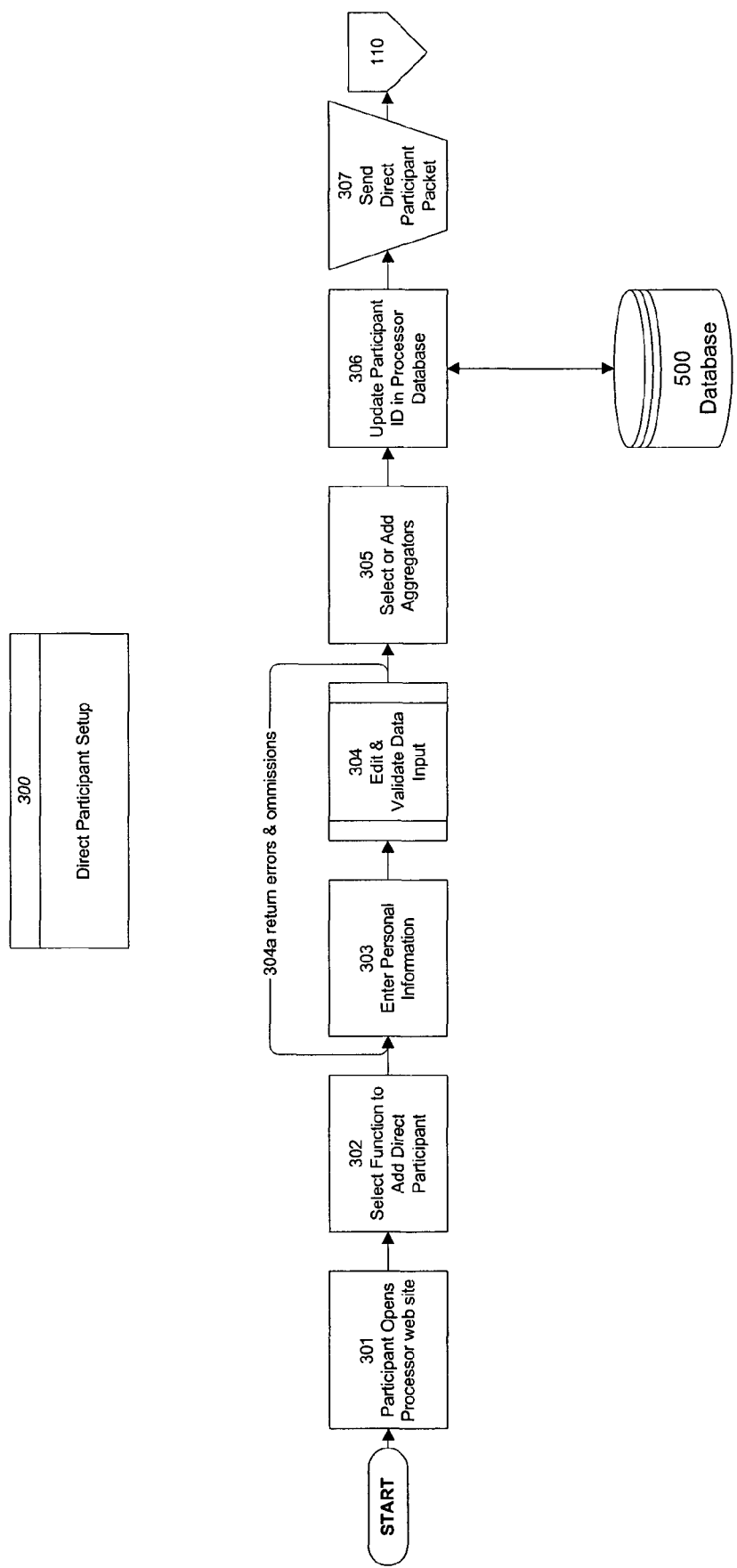
FIG. 16 is an exemplary flowchart that shows the enrollment process for direct participants, according to one embodiment of the present invention.

FIG. 16 is an exemplary flowchart that shows the enrollment process (300) for direct participants according to one embodiment of the present invention. A direct participant selects the online website (301) provided by the processor and selects the function to add himself as a direct participant (302). The participant enters his personal information (303) at the website. The information is then edited and validated (304). Any errors or omissions are reported back to the participant by way of the website (304*a*) for re-entry and re-processing. The direct participant selects (305) one or more aggregators that he wishes to receive the funds generated by his activity; the direct participant may request a new aggregator to be contacted for enrollment. The new direct participant is assigned an identification number and their participant data (306) is stored in the database (500). Next, the processor sends (307) the direct participant a participant packet.

Figure 17:
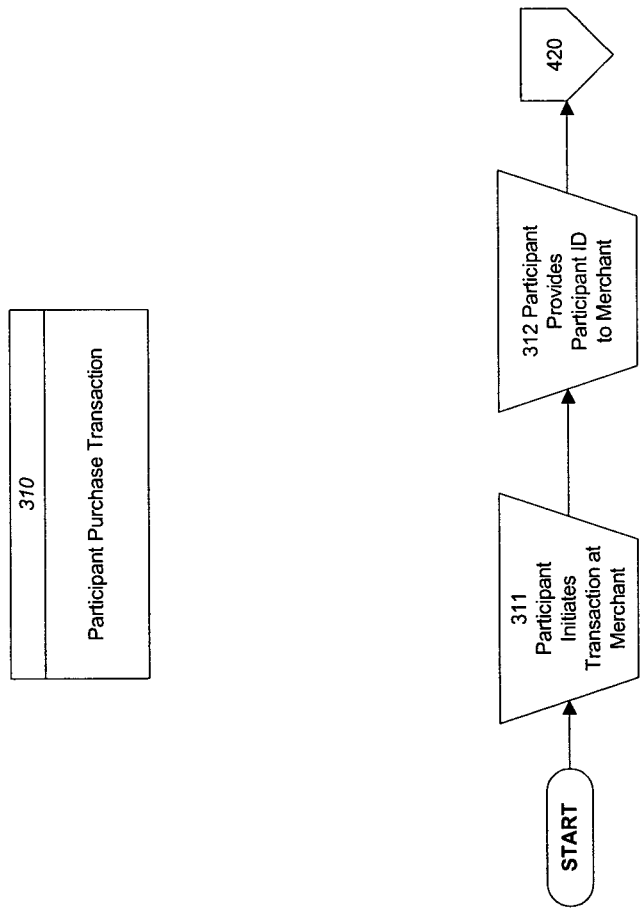
FIG. 17 is an exemplary flowchart illustrating the process of a participant making a purchase transaction at a merchant, according to one embodiment of the present invention.

FIG. 17 is an exemplary flowchart illustrating the process of a participant making a purchase transaction (310) at a merchant. The participant initiates a purchase transaction at the merchant (311) and provides her participant ID (312) to the merchant during the transaction. According to one embodiment of the present invention, the participant ID can be provided through the use of a bar coded card, bar coded label, or magnetic strip. The participant ID may be cross-referenced by the merchant to the participant phone number or any other personal identification number or merchant tracking number in use by the merchants for tracking their customers. The identification number could be entered by the participant while making an on-line purchase on the internet at the website provided by the merchant.

Figure 18:
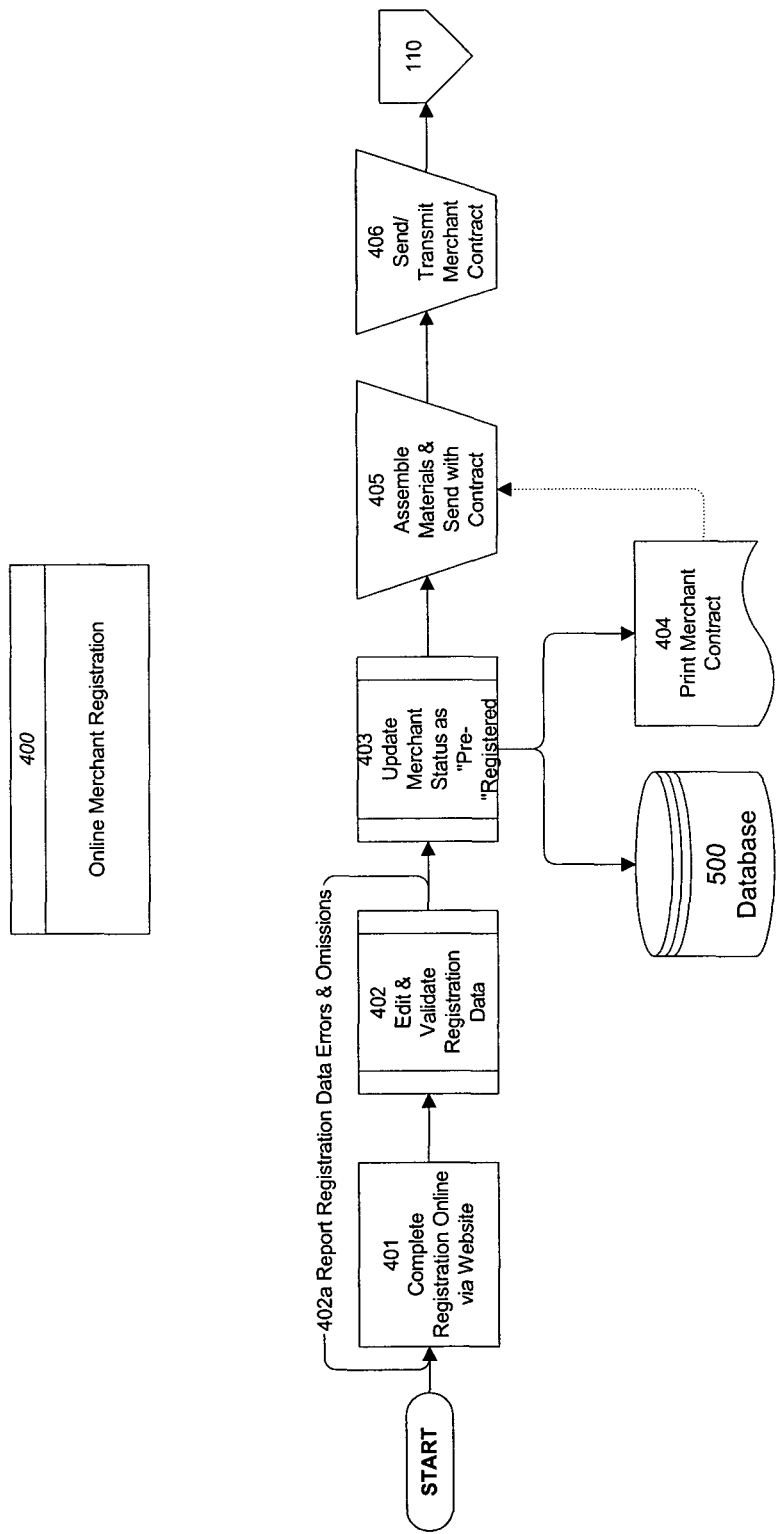
FIG. 18 is an exemplary flowchart that shows the process for the online registration of a merchant on the processor web site, according to one embodiment of the present invention.

FIG. 18 is an exemplary flowchart that shows a process for the online registration of a merchant (400) on the processor web site. The merchant selects the website provided by the processor and completes the registration (401) information. The data is edited and validated (402) and any registration data errors or omissions are reported back to the user on the website (402*a*) for correction, re-entry and re-processing. Once entered successfully, the merchant status is set to pre-registered (403), the information is stored in database (500), and a merchant contract (404) is printed. Each merchant should indicate their percentage participation, sign the contract, and assemble other documents or information required to be submitted with the contract (405). The merchant submits the contract to the processor (406)

Figure 19:
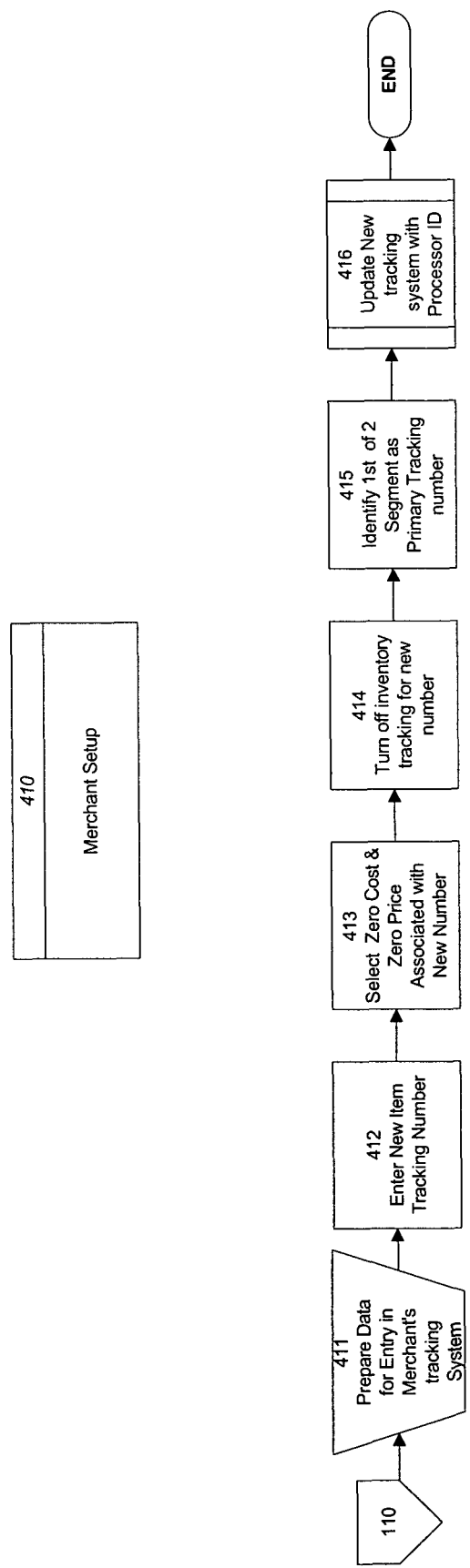
FIG. 19 is a flowchart showing the process for a merchant to set up their internal systems to accommodate use of the CAMP, an exemplary to one embodiment of the present invention.

FIG. 19 is an exemplary flowchart showing the process for a merchant to set up (410) her internal systems to accommodate use of the CAMP, according to one embodiment of the present invention. The merchant receives the processor identification number when she has successfully registered (400) and has been set (410) up in the processor database (500). The processor identification number is the first of two segments that comprise the participant identification number of which, the first is significant for identification of the processor and the second segment identifies the participant ID number.

The merchant prepares the necessary information for entry in the merchant's customer tracking, merchandise tracking, or service tracking system (411). The merchant enters the new item tracking number (412) and if necessary for her system, sets it to a zero cost and sales price (413), turn off inventory tracking (414), and identifies the first segment as primary tracking number (415). The merchant tracking system is then updated with the new information (416). The Participant ID number is not necessary for tracking transactions in the merchant transaction tracking system, but it is stored with each transaction to facilitate the identification of the individual participant when reporting activity (430) to the processor. According to one embodiment of the present invention, the processor identification and participant ID numbers are Universal Product Codes or bar codes and are stored in a merchant point-of-sale system as an inventory or membership number.

Figure 20:
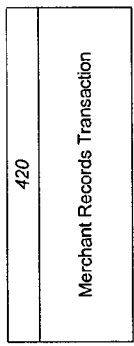
FIG. 20 is an exemplary flowchart that depicts the steps involved in a merchant's recording a purchase transaction by a Participant, according to one embodiment of the present invention.
Figure 20A:
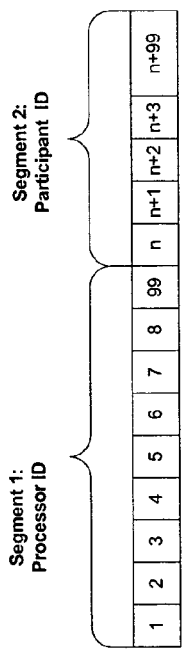

FIG. 20 is an exemplary flowchart that depicts the steps involved in a recording a purchase transaction (420) by a merchant's system, according to one embodiment of the present invention. The participant provides her participant ID to merchant during a purchase transaction (421). The merchant records the participant ID when processing the transaction in their sales tracking system, such as "scanning" the participant ID as a bar code or "swipes" a magnetic strip with the ID encoded. The participant ID is stored in the merchant tracking system (423) with relevant transaction data. The merchant tracking system may include a database; storing transaction detail data with unique processor and participant ID numbers that identifies that transaction as part of the CAMP. This first segment is significant to the merchant for tracking transactions. The second segment is indicative data for the merchant and only passed to the processor as part of the merchant reporting (430) process.

Figure 21:
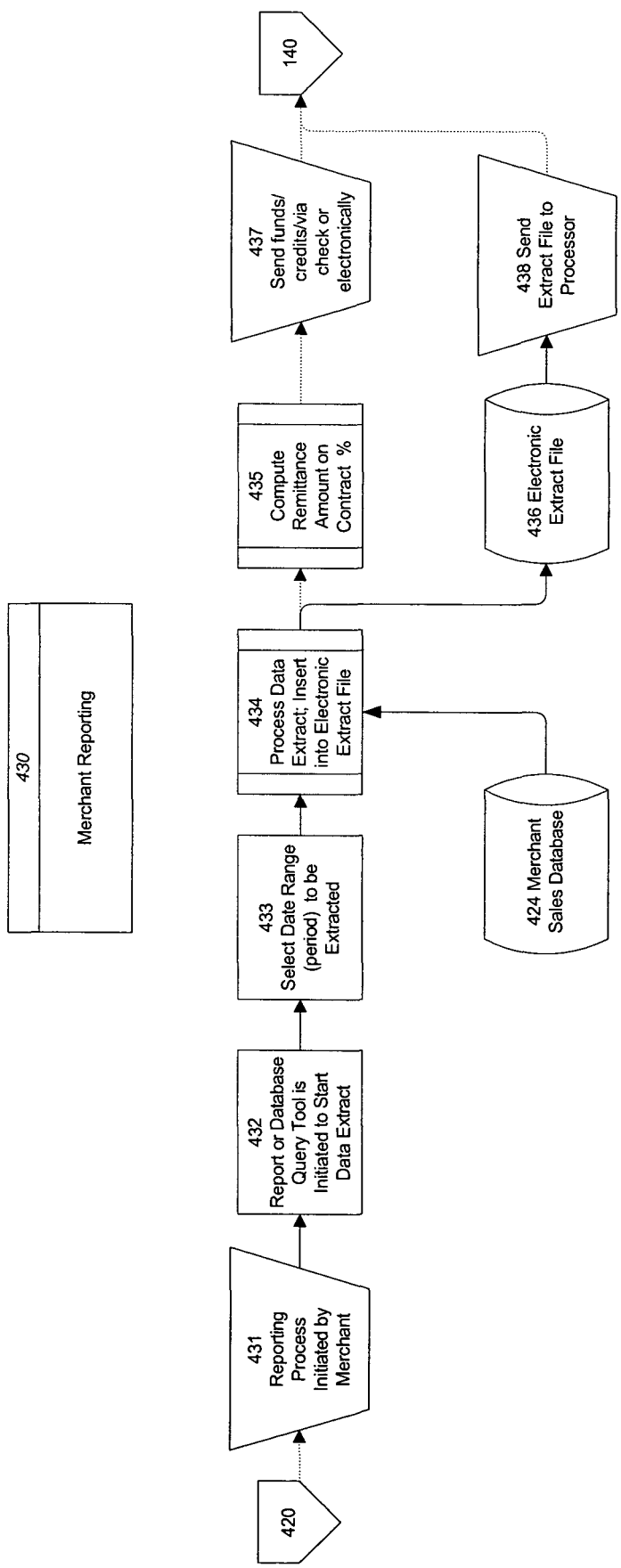
FIG. 21 is an exemplary flowchart that shows the steps undertaken by a merchant for providing a periodic merchant report to the processor, according to one embodiment of the present invention.

FIG. 21 is an exemplary flowchart illustrating the steps undertaken by a merchant for providing a periodic merchant report (430) to the processor, according to one embodiment of the present invention. The merchant reporting process is initiated (431) by the merchant on a periodic basis as defined in the merchant contract (404). A report or database query tool is initiated to start a data extraction (432) process to retrieve the relevant data from the merchant tracking system and/or database (424) and provide the necessary data for reporting CAMP activity at the merchant. The applicable date range is selected (433) by the merchant and the data is extracted (434) and inserted into an electronic extract file (436). The electronic extract file is transmitted to the processor (438) as the periodic report. The merchant computes (435) the correct remittance amount based on the total amount stored in the extracted file and sends funds or some financial credits (437) to the processor by check or electronic funds transfer.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for collaborative affinity marketing including a processor, a plurality of aggregators, a participant, and a plurality of merchants, the method comprising:
   receiving by a collaborative affinity marketing computer system enrollment information from the plurality of aggregators, the participant, and the plurality of merchants;
   assigning a participant identification code to the participant by said computer system, wherein the participant identification code keeps identity of the participant anonymous;
   storing the enrollment information of the plurality of aggregators, the participant, and the plurality of merchants in a database, wherein no merchant is yet selected by the participant;
   selecting by the participant a selected aggregator from the plurality of aggregators using a participant computer terminal;
   providing the participant identification code to any of the plurality of merchants, when the participant initiates a purchase transaction with said any of the plurality of merchants;
   storing information about the participant identification code and an amount for the purchase transaction in one or more storage media, by said any of the plurality of merchants;
   receiving the stored participant identification code, the amount for the purchase transaction, and funds corresponding to a portion of the amount for the purchase transaction by the processor using said collaborative affinity marketing computer system;
   verifying the received funds against the received amount for the purchase transaction by the processor; and
   sending a portion of the funds received by the processor to the selected aggregator,
   wherein each of the processor, selected aggregator, participant, and merchant has a respective access right for accessing the stored information in the database and different portions of the stored information are accessible by the processor, selected aggregator, participant, and merchant based on the respective access rights, and wherein the collaborative affinity marketing system is capable of enrolling the participant while maintaining participant's anonymity from the selected aggregator, the merchant, and the processor.

2. The method of claim 1, wherein the participant enrolls with the processor using said participant computer terminal.

3. The method of claim 1, wherein the participant enrolls with the selected aggregator using said participant computer terminal.

4. The method of claim 3, further comprising sending the participant identification code to the processor without disclosing the identity of the participant.

5. The method of claim 1, wherein the providing the participant identification code to the merchant comprises of presenting a participant card to the merchant.

6. The method of claim 5, wherein the participant card is one or more of a group of a bar coded card, a card with magnetic strip, a smart card, and a radio frequency identification card.

7. The method of claim 1, wherein the sending a portion of the funds received by the processor from the merchant to the selected aggregator comprises of providing a credit to the aggregator.

8. The method of claim 1, wherein the purchase transaction is an on-line transaction and the participant identification code is provided to the merchant electronically.

9. The method of claim 1, wherein the providing the participant identification code to the merchant comprises of scanning a fingerprint or retina of the participant.

10. The method of claim 1, wherein the participant identification code is stored in a merchant sales tracking system as an item, when the participant initiates a purchase transaction.

11. The method of claim 1, wherein the selected aggregator is one or more of the group a not-for-profit organization, a marketer organization or a product distributor.

12. The method of claim 1, wherein the enrollment information of the plurality of aggregators, participant, and merchant are stored in a processor database.

13. The method of claim 12, wherein the processor database is accessible via a processor website.

14. The method of claim 1, wherein the funds corresponding to a portion of the amount of purchase transaction are sent to the processor via electronic fund transfer.

15. The method of claim 1, wherein the portion of the funds received by the processor from the merchant are sent to the selected aggregator via electronic fund transfer.

16. The method of claim 1, further comprising storing historical data for each of the processor, selected aggregator, participant, and merchant.

17. The method of claim 1, further comprising validating the stored participant identification code, the amount of purchase transaction, and the funds corresponding to a portion of the amount of purchase transaction by the processor.

18. The method of claim 17, further comprising processing the validated stored participant identification code, amount of purchase transaction, and funds corresponding to a portion of the amount of purchase transaction by the processor for statistical and demographic analysis.

19. The method of claim 1, further comprising sending a report generated by the merchant to the processor.

20. The method of claim 1, further comprising sending a report generated by the processor to the selected aggregator.

21. The method of claim 1, further comprising generating a report by the processor for the participant.

22. The method of claim 1, further comprising:
   storing a contract rebate percentage for each of the plurality of merchants;
   receiving transaction data and financial information by the processor from the merchant; and
   validating the received financial information and validating the received funds against the stored contract rebate percentage for the merchant.

23. A method for coordinating and managing rebates by a merchant of a portion of a purchase made by a participant to an aggregator, the method comprising:
   registering with one or more registry by the aggregator, the participant, and the merchant;
   generating a participant identification code for the participant and a processor identification code for the processor;
   storing registration information of the aggregator, participant, and merchant;
   providing the participant identification code and the processor identification code to the merchant, when the participant initiates the purchase with the merchant;
   storing the participant identification code and amount of purchase transaction by the merchant as sale tracking item;
   sending the stored participant identification code, the stored amount of purchase transaction, and funds corresponding to a portion of the amount of purchase transaction to the processor based on the stored processor identification code; and sending a portion of the funds received by the processor from the merchant to the aggregator.

24. The method of claim 23, wherein the participant registers with the processor and selects the aggregator as a desired aggregator.

25. The method of claim 23, wherein the participant registers with the aggregator.

26. The method of claim 25, further comprising sending the participant identification code to the processor without disclosing the identity of the participant.

27. The method of claim 23, wherein each of the processor, aggregator, participant, and merchant has a respective access right for accessing the stored information and different portions of the stored information are accessible by the processor, aggregator, participant, and merchant based on their respective access right.

28. The method of claim 23, wherein the participant is capable of enrolling with the collaborative affinity marketing while maintaining participant's anonymity.

29. The method of claim 23, wherein the step of providing the participant identification code to the merchant comprises of presenting to the merchant one or more of the group a bar coded card, a card with a magnetic strip, a smart card, and a radio frequency identification card.

30. The method of claim 23, wherein the purchase transaction is an on-line transaction and the participant identification code is provided to the merchant electronically.

31. The method of claim 23, wherein the participant identification code and the processor identification code are stored in a merchant sale tracking system as an item, when the participant initiates a purchase transaction.

32. The method of claim 23, wherein the registration information of the aggregator, participant, and merchant are stored in a processor database.

33. The method of claim 32, wherein the processor database is accessible via a processor website.

34. The method of claim 23, wherein the funds corresponding to a portion of the amount of purchase transaction and the portion of the funds received by the processor from the merchant are sent to the processor via electronic fund transfer.

35. The method of claim 23, further comprising sending a report generated by the merchant to the processor.

36. The method of claim 23, further comprising sending a report generated by the processor to the aggregator.

37. The method of claim 23, further comprising generating a report by the processor for the participant.

38. The method of claim 23, wherein the step of sending a portion of the funds received by the processor from the merchant to the aggregator comprises of providing a credit to the aggregator.

39. A system for collaborative affinity marketing including a processor, a plurality of aggregators, a participant, and a plurality of merchants, comprising:
means for receiving enrollment information from the plurality of aggregators, the participant, and the plurality of merchants;
means for assigning a participant identification code to the participant, wherein the participant identification code keeps identity of the participant anonymous;
a database for storing the enrollment information of the plurality of aggregators, the participant, and the plurality of merchants, wherein no merchant is yet selected by the participant;
means for selecting by the participant a selected aggregator from the plurality of aggregators;
means for providing the participant identification code to any of the plurality of merchants, when the participant initiates a purchase transaction with said any of the plurality of merchants;
means for storing information about the participant identification code and an amount for the purchase transaction, by said any of the plurality of merchants;
means for receiving the stored participant identification code, the amount for the purchase transaction, and funds corresponding to a portion of the amount for the purchase transaction by the processor;
means for verifying the received funds against the received amount for the purchase transaction by the processor; and
means for sending a portion of the funds received by the processor to the selected aggregator,
wherein each of the processor, selected aggregator, participant, and merchant has a respective access right for accessing the stored information in the database and different portions of the stored information are accessible by the processor, selected aggregator, participant, and merchant based on the respective access rights, and wherein the collaborative affinity marketing system is capable of enrolling the participant while maintaining participant's anonymity from the selected aggregator, the merchant, and the processor.

40. The system of claim 39, further comprising means for enrolling the participant with the processor.

41. The system of claim 39, further comprising means for enrolling the participant with the selected aggregator.

42. The system of claim 39, further comprising means for sending the participant identification code to the processor without disclosing the identity of the participant.

43. The system of claim 39, wherein the means for providing the participant identification code to the merchant comprises means for providing one or more of a group of a bar coded card, a card with magnetic strip, a smart card, and a radio frequency identification card to the merchant.

44. The system of claim 39, the means for storing enrollment information of the plurality of aggregators, participant, and merchant is a processor database accessible via a processor website.

45. The system of claim 39, wherein the means for sending a portion of the funds received by the processor from the merchant to the selected aggregator comprises of means for providing a credit to the selected aggregator.

46. The system of claim 39, further comprising means for storing the participant identification code in a merchant sale tracking system as an item.

47. A system for coordinating and managing rebates by a merchant of a portion of a purchase made by a participant to an aggregator, the method comprising:
means for registering with one or more registry by the aggregator, the participant, and the merchant;
means for generating a participant identification code for the participant and a processor identification code for the processor;
means for storing registration information of the aggregator, participant, and merchant;
means for providing the participant identification code and the processor identification code to the merchant, when the participant initiates the purchase with the merchant;
means for storing the participant identification code and amount of purchase transaction in a merchant sale tracking system as an item;

means for sending the stored participant identification code, the stored amount of purchase transaction, and funds corresponding to a portion of the amount of purchase transaction to the processor based on the stored processor identification code; and means for sending a portion of the funds received by the processor from the merchant to the aggregator.

48. A computer-readable medium having stored thereon a set of instructions including instruction for coordinating and managing rebates by a merchant of portion of a purchase made by a participant to an aggregator through a web site interface the instructions, when executed by a plurality of computers connected to the Internet, cause the computers to perform the steps of:

enrolling with a website by the aggregator, the participant, and the merchant;

assigning a participant identification code to the participant;

storing enrollment information of the aggregator, participant, and merchant;

providing the participant identification code to the merchant, when the participant initiates a purchase transaction with the merchant;

storing the participant identification code and amount of purchase transaction by the merchant;

sending the stored participant identification code, the amount of purchase transaction, and funds corresponding to a portion of the amount of purchase transaction to the processor; and sending a portion of the funds received by the processor from the merchant to the aggregator, wherein each of the processor, aggregator, participant, and merchant has a respective access right for accessing the stored information and different portions of the stored information are accessible by the processor, aggregator, participant, and merchant based on their respective access right.

* * * * *